(12) United States Patent (10) Patent No.: US 8,159,784 B2
Yamazaki et al. (45) Date of Patent: Apr. 17, 2012

(54) MAGNETIC RECORDING MEDIUM AND PRODUCTION METHOD THEREOF

(75) Inventors: Yoshikazu Yamazaki, Kounosu (JP); Daisuke Yano, Kounosu (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 1102 days.

(21) Appl. No.: 11/571,393

(22) PCT Filed: Jun. 30, 2005

(86) PCT No.: PCT/JP2005/012064
§ 371 (c)(1), (2), (4) Date: Feb. 11, 2008

(87) PCT Pub. No.: WO2006/003985
PCT Pub. Date: Jan. 12, 2006

(65) Prior Publication Data
US 2008/0253255 A1 Oct. 16, 2008

(30) Foreign Application Priority Data

Jun. 30, 2004 (JP) ................................. 2004-193418
Jun. 30, 2004 (JP) ................................. 2004-193419

(51) Int. Cl.
*G11B 3/74* (2006.01)
(52) U.S. Cl. ...................................................... 360/135
(58) Field of Classification Search .................... 360/135
See application file for complete search history.

(56) References Cited

U.S. PATENT DOCUMENTS

| 4,403,138 A | 9/1983 | Battarel et al. |
| 4,801,392 A | 1/1989 | Adair et al. |
| 6,110,330 A * | 8/2000 | Lin et al. ................... 204/192.16 |
| 6,139,936 A * | 10/2000 | Weiss ............................ 428/141 |
| 2003/0091866 A1 | 5/2003 | Ejiri et al. |

FOREIGN PATENT DOCUMENTS

| EP | 0 040 561 A2 | 11/1981 |
| FR | 2183486 A | 12/1973 |

(Continued)

OTHER PUBLICATIONS

International Search Report of PCT/JP2005/012064, date of mailing Sep. 9, 2005.

(Continued)

*Primary Examiner* — Allen Cao
(74) *Attorney, Agent, or Firm* — Westerman, Hattori, Daniels & Adrian, LLP

(57) ABSTRACT

The magnetic recording medium of the present invention has a pattern formed using a pattern-forming agent in a laminate of multiple layers including a base material and a magnetic recoding layer, wherein the pattern is recognized on the surface of the laminate opposite to the base material, and the pattern-forming agent is distributed through the thickness of the laminate, wherein a region between the center of the magnetic recording layer and a magnetic recording-reading side of the laminate has an area having a density gradient of the pattern-forming agent which gradually declines in the direction from the center of the magnetic recording layer to the magnetic recording-reading side.

17 Claims, 10 Drawing Sheets

FOREIGN PATENT DOCUMENTS

| | | | |
|---|---|---|---|
| GB | 1 376 424 | A | 12/1974 |
| JP | 59-168933 | A | 9/1984 |
| JP | 63-148415 | A | 6/1988 |
| JP | 2-201728 | A | 8/1990 |
| JP | 6-183185 | A | 7/1994 |
| JP | 09-059541 | A | 3/1997 |
| JP | 9-309287 | A | 12/1997 |
| JP | 2000-002160 | A | 1/2000 |
| JP | 2000-155937 | A | 6/2000 |
| JP | 2001-266335 | A | 9/2001 |

OTHER PUBLICATIONS

International Search Report of PCT/JP2005/012064, date of mailing Sep. 20, 2005.

Communication pursuant to Article 94(3) EPC dated Mar. 15, 2010, issued in corresponding European Patent Application No. 05755842.1.

European Search Report dated Jun. 16, 2009, issued in corresponding European Patent Application No. 05755842.1.

* cited by examiner

MAGNETIC RECORDING MEDIUM AND PRODUCTION METHOD THEREOF

TECHNICAL FIELD

The present invention relates to a magnetic recording medium formed by laminating multiple layers including a base material and a magnetic recording layer and having a pattern recognized on the magnetic reading side of the magnetic recording layer, a method of producing the magnetic recording medium, and a transferable laminate used in the method of producing the magnetic recording medium. The present invention particularly relates to a card type magnetic recording medium formed by laminating layers including a magnetic recording layer on a card base material, such as credit cards and bank cards, and has on the magnetic stripe part a pattern recognized on the magnetic reading side, a method of producing the magnetic recording medium, and a transferable laminate used in the method of producing the magnetic recording medium.

BACKGROUND ART

Recently, various patterns are formed on various magnetic recording media for practical and design purposes.

It is particularly important for magnetic cards requiring sophisticated designs such as credit cards and bank cards to have a high quality design. Conventionally, colored magnetic stripes are known, which are formed by providing a colored layer on the magnetic stripe on a card base material to completely conceal the black or brown color of magnetic recording layer which is inherent in magnetic powder. Recently, pattern formed magnetic stripes are also produced, which are formed by providing a pattern on the magnetic recording layer or on the colored layer on the magnetic recording layer.

In order to form such a pattern formed magnetic stripe, as shown in Procedure of FIG. 11, a release layer and a protective layer or a releasable protective layer is formed on a temporal carrier base; a pattern is formed thereon; a colored layer to conceal the hue of the magnetic recording layer, a magnetic recording layer, and a heat-sensitive adhesive layer are further formed in sequence so as to form a laminate; and the laminate is cut to a desired width to produce a transferable laminate for forming a magnetic stripe.

The transferable material of the magnetic stripe-forming transferable laminate obtained as described above is transferred on the overlay sheet of a card base and heat-pressed with the center core and the overlay sheet on the opposite side to obtain a pattern formed magnetic stripe card having the magnetic stripe transferable material embedded in the overlay sheet (see FIG. 1).

However, the pattern formed magnetic stripe formed as described above has a pattern on the magnetic recording-reading side of the magnetic recording layer. Therefore, the spacing, or the distance between the magnetic head and the magnetic recording layer during the recording/reading, varies between the patterned area and the non-patterned area and, accordingly, reading output-fluctuations occur. Consequently, the chance of possible information reading errors tends to be increased.

A disclosed method to eliminate the level-difference between the patterned area and the non-patterned area due to the pattern-formation is to fill the space of the non-patterned area using the negative pattern of the patterned area (see Patent Document 1). The negative pattern printed in the non-patterned area can be more indistinctive for further effects of the filler ink when the colored layer (concealing layer) formed on the entire patterned area and the space-filler ink applied to the recess of the non-patterned area have the same hue. This method has a certain effect on reducing the output fluctuations due to the level-difference, but it is not perfect. Furthermore, an additional coating step of filling the non-patterned area is required, which inevitably reduces the production efficiency.

In order to resolve the above problem, a method of producing a magnetic tape is proposed in which a concealing layer and a resin coating layer that can be dyed using a disperse dye are formed on a magnetic recording layer and the resin coating layer is dyed using a sublime disperse dye (see Patent Document 2). In this method, the level-difference due to the pattern-formation is prevented; however, the formation of the resin coating layer is necessary for settling the dye in addition to the concealing layer. Also, it is generally difficult to obtain both excellent sublimation and stability in sublime dyes. Therefore, the formed pattern does not always have sufficient weather-resistant storage stability and stability over time. Furthermore, in this method, a pattern is formed on the outermost resin coating layer using a sublime dye and a protective layer is then formed thereon. That is, the laminate is not formed at a time in the transfer process. The process is divided and, therefore, the production efficiency is reduced.

On the other hand, it is known that some magnetic cards with which security is an important issue such as credit cards and bank cards carry a pattern formed on the magnetic recording layer using infrared ink or a fluorescent agent as a special pattern for anti-counterfeit measure. These patterns are usually invisible. Their position and presence is concealed and, importantly, they are recognizable only using a specific light source or detector. However, when the level-difference due to the pattern is observed, the security level is lowered as described below.

For example, a fluorescent pattern formed using a fluorescent agent should be invisible under ultraviolet light in the sunlight or room light as described above. It should be recognized as a fluorescent pattern only using ultraviolet light emitted from a special ultraviolet light irradiator to confirm the authenticity of the card.

Therefore, a concealing layer is formed on the area where the fluorescent pattern is formed and the fluorescent pattern is recognized only when irradiated with intensive ultraviolet light using a special ultraviolet light irradiator (see Patent Document 3).

However, the concealing layer usually has a thickness of several μm or smaller so as to reduce loss in reading output. Therefore, it is difficult to completely eliminate the level-difference of the fluorescent pattern. Even if the fluorescent pattern is unrecognizable in the sunlight or under the room light or the like because of the concealing layer, the remaining level-difference formed by the fluorescent pattern and never completely eliminated inconveniently makes the pattern visible because of the reflection of light. Such a remaining level-difference causes reading output-fluctuations and deteriorates signals in quality.

In order to resolve the above problem, a method of producing a magnetic card having a fluorescent pattern is disclosed in which a release layer, an overcoat layer, a pattern printing layer, a concealing layer, and a fluorescent pattern-forming area are laminated on a temporal carrier base in sequence to form a transferable material and the transferable material is transferred to a card base material where a magnetic recording layer is previously formed in the transfer step (see Patent Document 4). In this method, the ink in the fluorescent pattern-forming area formed on the concealing layer is appropriately impregnated into the concealing layer so that the fluorescent agent impregnated in the transferred concealing layer produces fluorescence under ultraviolet light. The fluorescence is not blocked by the concealing layer or no level difference due to the fluorescent pattern occurs. However, the ink composition and the resin composition of the concealing layer have to be carefully selected to properly impregnate the fluorescent agent into the concealing layer. The fluorescent pattern may highly possibly be blurred or fail to provide sufficient emission intensity as a result of slight changes in procedure. Therefore, a limited selection of inks and resins and a limited degree of freedom in design are imposed.

Furthermore, in the prior art method of producing a pattern formed magnetic recording medium in which a pattern is formed on the magnetic-stripe part through the transfer step has the following inconvenience. The pattern is printed on the transferable laminate usually after a release layer and a protective layer or a releasable protective layer are formed on a temporal carrier base. Then, a colored layer, a magnetic recording layer, and a heat-sensitive adhesive layer are laminated in sequence. In other words, the pattern has to be printed in the earlier stage of the production of a magnetic stripe-forming transferable laminate. After a pattern is determined and produced, many more steps and time is required to produce a magnetic stripe-forming transferable laminate. Therefore, when the pattern has to be modified after the patterned magnetic stripe-forming transferable laminate is completed, the pattern cannot be modified in a short time and the pattern-modification is a major cause of significantly delayed delivery and reduced performance.

When the pattern is formed on the magnetic recording layer of a magnetic recording medium as described above, the pattern often undergoes deteriorated signal properties or fails to fulfill the expected function as the sophisticated design or anti-counterfeit.

Furthermore, the prior art method of producing a pattern formed magnetic recording medium does not offer excellent production efficiency.

Patent Document 1: Japanese Unexamined Patent Application, Publication No. S59-168933
Patent Document 2: Japanese Unexamined Patent Application, Publication No. 2000-155937
Patent Document 3: Japanese Unexamined Patent Application, Publication No. 2000-002160
Patent Document 4: Japanese Unexamined Patent Application, Publication No. H09-309287

DISCLOSURE OF THE INVENTION

An object of the present invention is to provide a magnetic recording medium having a pattern recognized on the surface of the magnetic recording-reading side of the magnetic recording medium and stable over time, wherein there is no level-difference in the patterned area due to the pattern-formation, thereby leading to no reading output-fluctuations due to the level-difference and no failure in the expected function of the pattern.

Another object of the present invention is to provide a magnetic recording medium-production method for producing a magnetic recording medium having a pattern recognized on the surface of the magnetic recording-reading side through a transfer process, wherein there is no level-difference in the patterned area, thereby leading to no reading output-fluctuations and excellent production efficiency, and a smaller number of steps from the pattern-formation to the completion of a magnetic recording medium make it possible to deal quickly with to the demand of the pattern-modification.

Furthermore, another object of the present invention is to provide a transferable laminate used in the transfer process that enables efficient production of a magnetic recording medium having a pattern recognized on the surface of the magnetic recording layer side and having no level-difference in the patterned area due to the pattern-formation.

Namely, an aspect of the present invention is to provide a magnetic recording medium having a pattern formed using a pattern-forming agent in a laminate of multiple layers including a base material and a magnetic recoding layer, wherein the pattern is recognized on the surface of the laminate opposite to the base material, and the pattern-forming agent is distributed through the thickness of the laminate, wherein a region between the center of the magnetic recording layer and a magnetic recording-reading side of the laminate has an area having a density gradient of the pattern-forming agent which gradually declines in the direction from the center of the magnetic recording layer to the magnetic recording-reading side.

Another aspect of the present invention is to provide a method of producing a magnetic recording medium having a pattern formed using a pattern-forming agent in a laminate of multiple layers including a base material and a magnetic recoding layer, wherein the pattern is recognized on the surface of the laminate opposite to the base material, and the pattern-forming agent is distributed through the thickness of the laminate, wherein a region between the center of the magnetic recording layer and a magnetic recording-reading side of the laminate has an area having a density gradient of the pattern-forming agent which gradually declines in the direction from the center of the magnetic recording layer to the magnetic recording-reading side, the method comprising:

forming on a temporal carrier base a transferable material having at least one magnetic recording layer and a pattern formed on a surface of the magnetic recording layer opposite to the surface of the magnetic recording layer in contact with the temporal carrier base using the pattern-forming agent;

subsequently transferring the transferable material from the temporal carrier base to the base material to form the laminate; and subsequently diffusing the pattern-forming agent such that the region between the center of the magnetic recording layer and a magnetic recording-reading side of the laminate has an area having a density gradient of the pattern-forming agent which gradually declines in the direction from the center of the magnetic recording layer to the magnetic recording-reading side.

Yet another aspect of the present invention is provide a method of producing a magnetic recording medium having a pattern formed using a pattern-forming agent in a laminate of multiple layers including a base material and a magnetic recoding layer, wherein the pattern is recognized on the surface of the laminate opposite to the base material, and the pattern-forming agent is distributed through the thickness of the laminate wherein a region between the center of the magnetic recording layer and a magnetic recording-reading side of the laminate has an area having a density gradient of the pattern-forming agent which gradually declines in the direction from the center of the magnetic recording layer to the magnetic recording-reading side, the method comprising:

forming on a temporal carrier base a transferable material having at least one magnetic recording layer and a pattern formed using a pattern-forming agent on a surface of the magnetic recording layer opposite to the surface of the magnetic recording layer in contact with the temporal carrier base;

subsequently diffusing the pattern-forming agent such that the region between the center of the magnetic recording layer and the boundary of magnetic recording layer contacting with a temporal carrier base has an area having a density gradient of the pattern-forming agent which gradually declines in the direction from the center of the magnetic recording layer to the boundary of magnetic recording layer and subsequently transferring the transferable material from the temporal carrier base to the base material to form the laminate.

Still another aspect of the present invention is to provide a method of producing a magnetic recording medium having a pattern formed using a pattern-forming agent in a laminate of multiple layers including a base material and a magnetic recording layer, wherein the pattern is recognized on the surface of the laminate opposite to the base material, and the pattern-forming agent is distributed through the thickness of the laminate such that a region between the center of the magnetic recording layer and a magnetic recording-reading side of the laminate has an area having a density gradient of the pattern-forming agent which gradually declines in the direction from the center of the magnetic recording layer to the magnetic recording-reading side, the method comprising:

forming on a temporal carrier base a transferable material having at least one magnetic recording layer;

subsequently transferring the transferable material to a pattern formed on a base material using a pattern-forming agent to form the laminate; and subsequently diffusing the pattern-forming agent such that the region between the center of the magnetic recording layer and a magnetic recording-reading side of the laminate has an area having a density gradient of the pattern-forming agent which gradually declines in the direction from the center of the magnetic recording layer to the magnetic recording-reading side.

In the magnetic recording medium of the present invention, the pattern-forming agent forming a pattern is distributed through the thickness of the laminate, wherein a region between the center of the magnetic recording layer and a magnetic recording-reading side of the laminate has an area having a density gradient of the pattern-forming agent which gradually declines in the direction from the center of the magnetic recording layer to the magnetic recording-reading side. The pattern-forming agent is not distributed in specific areas at higher densities or localized on the magnetic recording layer as in the conventional magnetic recording medium having a pattern. Therefore, no level-difference is observed in the patterned area and no reading output-fluctuations due to the level-difference occur.

In the method of producing the magnetic recoding medium of the present invention, the pattern-forming agent of the pattern formed either on the magnetic recording layer of a magnetic recording layer-containing transferable material or on a base material, or on both of them is diffused in the transferable material before or after the transferable material is transferred to the base to form a laminate such that a region between the center of the magnetic recording layer and a magnetic recording-reading side of the laminate has an area having a density gradient of the pattern-forming agent which gradually declines in the direction from the center of the magnetic recording layer to the magnetic recording-reading side, whereby the pattern is recognized on the laminate surface. Therefore, no level-difference corresponding to the patterned area is observed and no reading output-fluctuations due to the level-difference occur.

The transferable laminate of the present invention has on a temporal carrier base a magnetic recording layer and a pattern formed on the magnetic recording layer. After transferred to a base, the pattern is situated between the magnetic recording layer and the base. The pattern-forming agent is diffused before or after the transfer; then, it is distributed through the thickness of the laminate, wherein a region between the center of the magnetic recording layer and a magnetic recording-reading side of the laminate has an area having a density gradient of the pattern-forming agent which gradually declines in the direction from the center of the magnetic recording layer to the magnetic recording-reading side. Therefore, no level-difference corresponding to the patterned area is observed and no reading output-fluctuations due to the level-difference occur.

Furthermore, in the method of producing the magnetic recoding medium of the present invention, the area where the pattern is formed can be in the transferable material of the transferable laminate and on the magnetic recording layer or on a base. Therefore, the pattern can be formed in the final stage of the transferable laminate production or separately from the transferable laminate. In this way, a transferable laminate without a pattern is previously prepared and a pattern can be formed in the final stage after the pattern is determined. A smaller number of steps from the pattern-formation to the card production contribute to quick response to pattern changes.

Furthermore, coloring agents or fluorescent agents conventionally used in forming a pattern on a magnetic recording medium can basically be used for the pattern or fluorescent pattern formed in the method of producing the magnetic recoding medium of the present invention as they are. Therefore, the pattern at least has the same stability, light resistance, and weather resistance as those in the prior art method. The pattern on a magnetic recording medium produced in the method of the invention of the present application is diffused and held in the layers constituting the transferable material. Therefore, the pattern is not directly exposed to external light and mechanical contacts, presumably having excellent stability, durability, light resistance, and weather resistance.

DESCRIPTION OF THE REFERENCE NUMERALS

Figure 1:
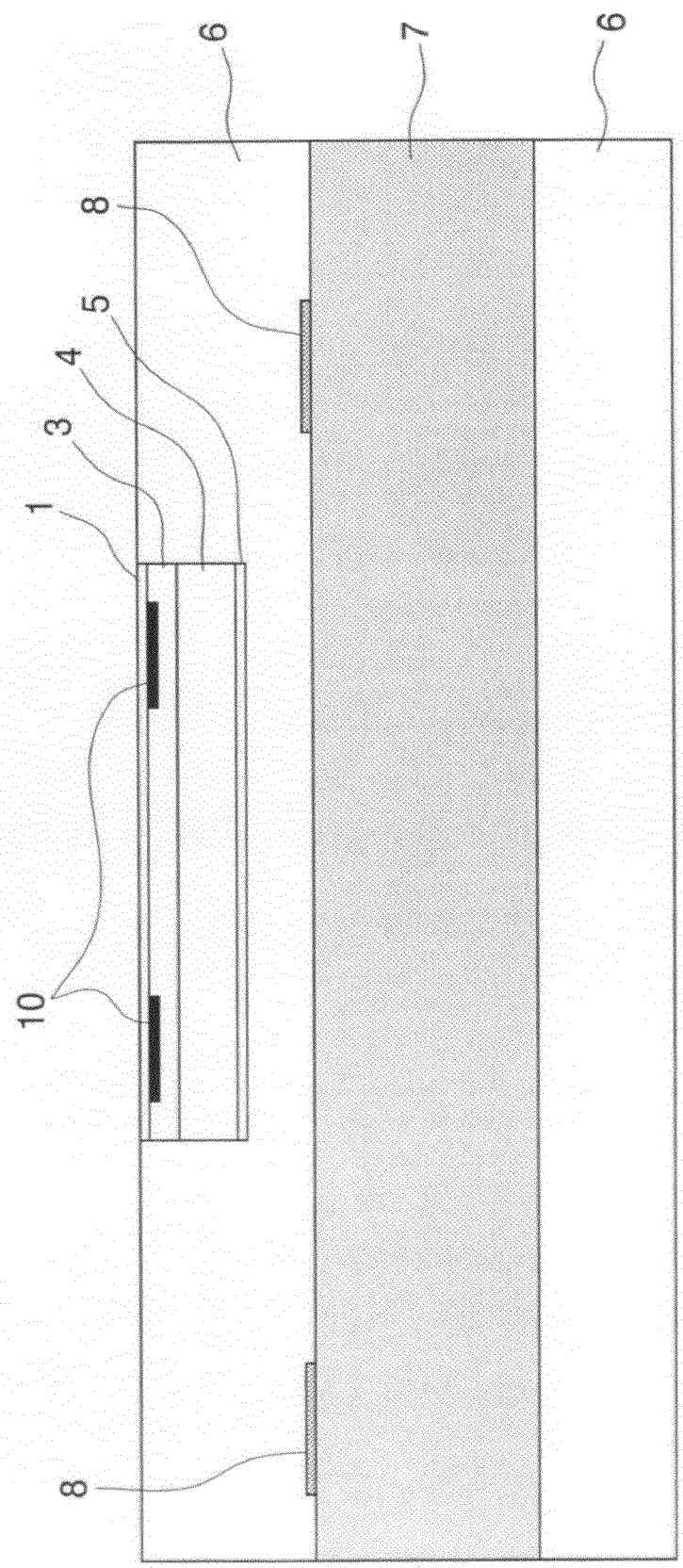
FIG. 1 is an enlarged cross-sectional view of a prior art magnetic card produced using a transferable laminate for forming a magnetic stripe.

1: pattern-forming agent anti-diffusion layer, 2: pattern-forming agent-diffused area, 3: colored layer, 4: magnetic recording layer, 5: heat-sensitive adhesive layer, 6: overlay sheet, 7: center core, 8: patterned area on a card, 9: temporal carrier base, 10: pattern-forming area.

BEST MODE FOR IMPLEMENTING THE INVENTION

The present invention is described in detail hereafter.

The magnetic recording medium of the present invention has a pattern formed using a pattern-forming agent in a laminate of multiple layers including a base material and a magnetic recording layer, the pattern being recognizable on the surface of the laminate opposite to the base material.

The base material of the present invention is in the form of a sheet or a plate and made of, for example, plastics such as polyvinyl chloride, nylon, cellulose diacetate, and polyethylene terephthalate, papers such as synthetic paper and cross paper, or complex materials of these. However, other materials can be used without particular limitations as long as they have strength and rigidity necessary for forming a laminate.

The pattern-forming agent used in the present invention includes various materials conventionally used in forming various patterns on magnetic recording media for functional and design purposes. They can be coloring agents and luminous coating materials for forming a visually recognizable pattern or fluorescent agents and materials used in infrared ink for forming a pattern recognizable under a light source or a detector. Alternatively, elements or compounds detectable only using a specific detector can be used to form a recognizable pattern.

When the pattern-forming agent in the magnetic recording medium of the present invention is a fluorescent agent, the fluorescent agent is distributed through the thickness of the magnetic recording medium, wherein a region between the center of the magnetic recording layer and a magnetic recording-reading side of the laminate has an area having a density gradient of the pattern-forming agent which gradually declines in the direction from the center of the magnetic recording layer to the magnetic recording-reading side. Therefore, the fluorescent agent is not localized, for example, in the surface layer of the magnetic card and does not create the level-difference where the pattern is produced as described above. Hence, the fluorescent pattern itself and the corresponding area and contents are not recognizable in the sunlight or under the room light without ultraviolet irradiation even if the concealing layer to cover the surface layer is not provided. In this way, anti-counterfeit information and identification information are not easily known from their print position and contents.

The pattern-forming agent of the present invention is distributed through the thickness of the laminate, wherein a region between the center of the magnetic recording layer and a magnetic recording-reading side of the laminate has an area having a density gradient of the pattern-forming agent which gradually declines in the direction from the center of the magnetic recording layer to the magnetic recording-reading side. "The magnetic recording-reading side" in the present invention means the side of an envisioned magnetic recording medium on which the recording/reading magnetic head makes contact with the magnetic recording medium.

The above described distribution cannot be obtained by the prior art method of forming a pattern in a magnetic recording medium in which the pattern-forming agent is distributed on the magnetic recording layer near the surface layer of the laminate at higher densities or is localized near the surface layer of the laminate to form a pattern. The above described distribution of the pattern-forming agent of the present invention can be obtained by diffusing the pattern-forming agent into the adjacent layers in sequence through thermal diffusion after a pattern is formed or by using the solvent for the pattern-forming agent in laminating and forming a pattern to erode the adjacent layers. However, the thermal diffusion is preferable because of easy control and freedom in the selection of the pattern-forming agent and resins for forming the laminate. The thermal diffusion occurs at different diffusion rates depending on the layers of the laminate. Basically, it is isotropic; the pattern-forming agent is gradually diffused from where the pattern is initially formed to where its density is lower in the laminate. Therefore, the distribution of the pattern-forming agent in the laminate is largely determined by the position where the pattern is formed in the laminate.

In order to distribute the pattern-forming agent such that the pattern-forming agent forms an area having a density gradient which gradually declines in the direction from the center of the magnetic recording layer to the magnetic recording-reading side, the pattern is formed between the layers on the side of the magnetic recording layer opposite to the magnetic recording-reading side or on the magnetic recording layer opposite to the magnetic recording-reading side. The pattern-forming agent is subject to isotropic diffusion and the pattern-forming agent diffused toward the magnetic recording-reading side forms a recognizable pattern. The pattern-forming agent is also diffused in the direction orthogonal to the thickness. However, because of a small thickness, the diffusion does not result in making the pattern too blurred to be recognized.

For example, in the production method of the present invention, multiple layers including a magnetic recording layer are formed on a temporal carrier base; a pattern is formed using a pattern-forming agent between the layers on the side of the magnetic recording layer opposite to the temporal carrier base or on the surface of the magnetic recording layer opposite to the surface in contact with the temporal carrier base; and the transferable material is transferred from the temporal carrier base to a base to form a laminate. Then, the pattern-forming agent is diffused such that a region between the center of the magnetic recording layer and a magnetic recording-reading side of the laminate has an area having a density gradient of the pattern-forming agent which gradually declines in the direction from the center of the magnetic recording layer to the magnetic recording-reading side. Consequently, the pattern-forming agent is diffused through the transferable material toward the side on which the transferable material has the front surface after transferred, whereby the pattern-forming agent is distributed through the thickness of the transferable material and the pattern becomes recognizable on the magnetic recording-reading side. The pattern-forming agent is not localized on the card surface. Therefore, fluctuations in the spacing or the distance between the magnetic head and the magnetic recording layer due to the formed pattern do not occur, causing no fluctuations in the magnetic reading output.

In the above described production method of the present invention, the transferable material can have multiple magnetic recording layers and, additionally, the pattern can be formed between the multiple magnetic layers.

Furthermore, in the production method of the present invention, one or multiple layers that are not magnetic recording layers can be provided on the side of the magnetic recording layer opposite to the temporal carrier base and a pattern can be formed between the magnetic recording layer and the multiple layers that are not magnetic recording layers or between the multiple layers that are not magnetic recording layers.

The components of the laminate formed on the base other than the magnetic recording layer and pattern-forming layer include a colored layer formed on the magnetic recording-reading side of the magnetic recording layer for concealing the hue of the magnetic recording layer. Furthermore, a heat-sensitive adhesive layer can be formed in contact with the base for improving the adhesion to the base in forming the laminate through the transfer process. Additionally, a pattern-forming agent anti-diffusion layer can be provided as the outermost layer on the magnetic recording-reading side of the magnetic recording layer for preventing the pattern-forming agent from being exposed on the surface layer of the magnetic recording medium and adhering to other items by contact.

Particularly, the magnetic recording medium, in which the magnetic recording layer and colored layer are provided on a base in this order and the pattern-forming agent is distributed in the magnetic recording layer and colored layer in the manner that there is an area having a density gradient of the pattern-forming agent which gradually declines in the direction from the center of the magnetic recording layer to the magnetic recording-reading side, has excellent recognizability and a sophisticated design because the pattern is recognized along with the background color of the colored layer.

The magnetic recording medium of the present invention has a recognizable pattern formed by diffusing a pattern-forming agent from the center of the magnetic recording layer to the magnetic recording-reading side before or after the transferable material is transferred; therefore, a diffusion area where the pattern-forming agent is diffused and held in a recognizable form is required. The area basically corresponds to the part where the pattern-forming agent is diffusible among the layers laminated in the direction of the magnetic recording-reading side in the laminate, and therefore depends on where the pattern is formed through the thickness of the magnetic recording medium. The diffusion area can be the colored layer or the colored layer, magnetic recording layer, and heat-sensitive adhesive layer. Alternatively, it can be the magnetic recording layer only; in such a case, the pattern tends to be less recognizable.

When the area has an excessively small thickness, it can only hold an insufficient amount of pattern-forming agent, whereby only an unsatisfactory pattern is formed. Furthermore, the pattern-forming agent which is restrained from being diffused in the thickness direction is horizontally diffused and the pattern tends to be blurred. On the other hand, when the area has an excessively large thickness, the diffusion area is also unnecessarily extended while the pattern-forming agent is diffused toward the magnetic recording-reading side up to the recognizable depth from the surface, whereby the pattern may be blurred. The total thickness of the part of laminate corresponding to the diffusion area, located from the pattern to the magnetic recording-reading side except for the thickness of the pattern-forming agent anti-diffusion layer described later is preferably 2 to 50 μm and more preferably 3 to 20 μm.

The pattern in the present invention can be formed at any position between the magnetic recording layer and the base after the laminate is formed on the base. Then, when the laminate is formed through the transfer process, the pattern can be formed at any position on the side of the magnetic recording layer opposite to the temporal carrier base in the transferable material provided on the temporal carrier base.

It is preferable that the step of forming a pattern-forming layer that is subject to frequent design changes be conducted in the final stage of the process of forming the transferable laminate if possible. For example, when a pattern is formed on the magnetic stripe of a magnetic card, the pattern is preferably formed on a heat-sensitive adhesive layer of the magnetic stripe-forming transferable laminate after the heat-sensitive adhesive layer, which corresponds to the surface layer of the transferable material on the temporal carrier base, is formed. Alternatively, the pattern-forming layer is preferably formed on a base to which the magnetic stripe is transferred. In this way, a blank magnetic stripe transferable laminate on which no pattern is printed can be prepared in advance, whereby as soon as a magnetic card design including the magnetic stripe pattern is determined, the pattern is printed on the top layer of the transferable laminate or on the card base, transferred, and heat-pressed to produce a card. This allows a magnetic card having a pattern formed magnetic stripe to be produced in a short time after the order is received.

The pattern formed as described above can be diffused in the transferable material by heating the transferable material in the form of a transferable laminate before the transfer or by transferring the transferable material to a base to form a magnetic recoding medium and then heating it. Particularly, when the magnetic recording medium is a magnetic card, multiple card bases, magnetic stripes or the like are heat-pressed for laminating and integrating them in the final stage of the magnetic card production. Therefore, the pattern-forming agent can be diffused in this heat-pressing step. Regarding the conditions for diffusing the pattern-forming agent, the temperature, heating time, amount of the pattern-forming agent and the like are appropriately adjusted according to diffusivity of the pattern-forming agent and the types and Tg of the resins used in the laminate.

A method of producing a magnetic card having a magnetic stripe on which a pattern is formed is described in detail hereafter as an embodiment of the method of producing the magnetic recording medium of the present invention.

Figure 2:
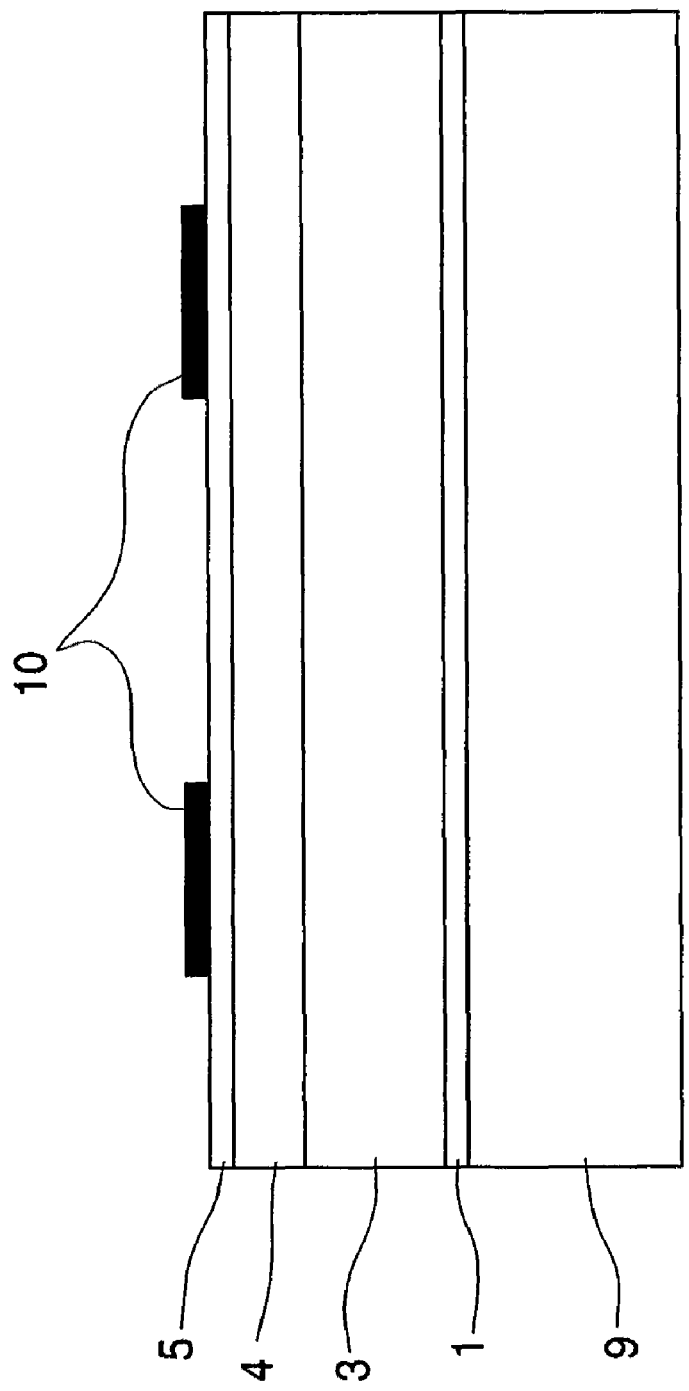
FIG. 2 is a cross-sectional view showing an embodiment of the transferable laminate used in the method of producing the magnetic recording medium of the present invention.
Figure 9:
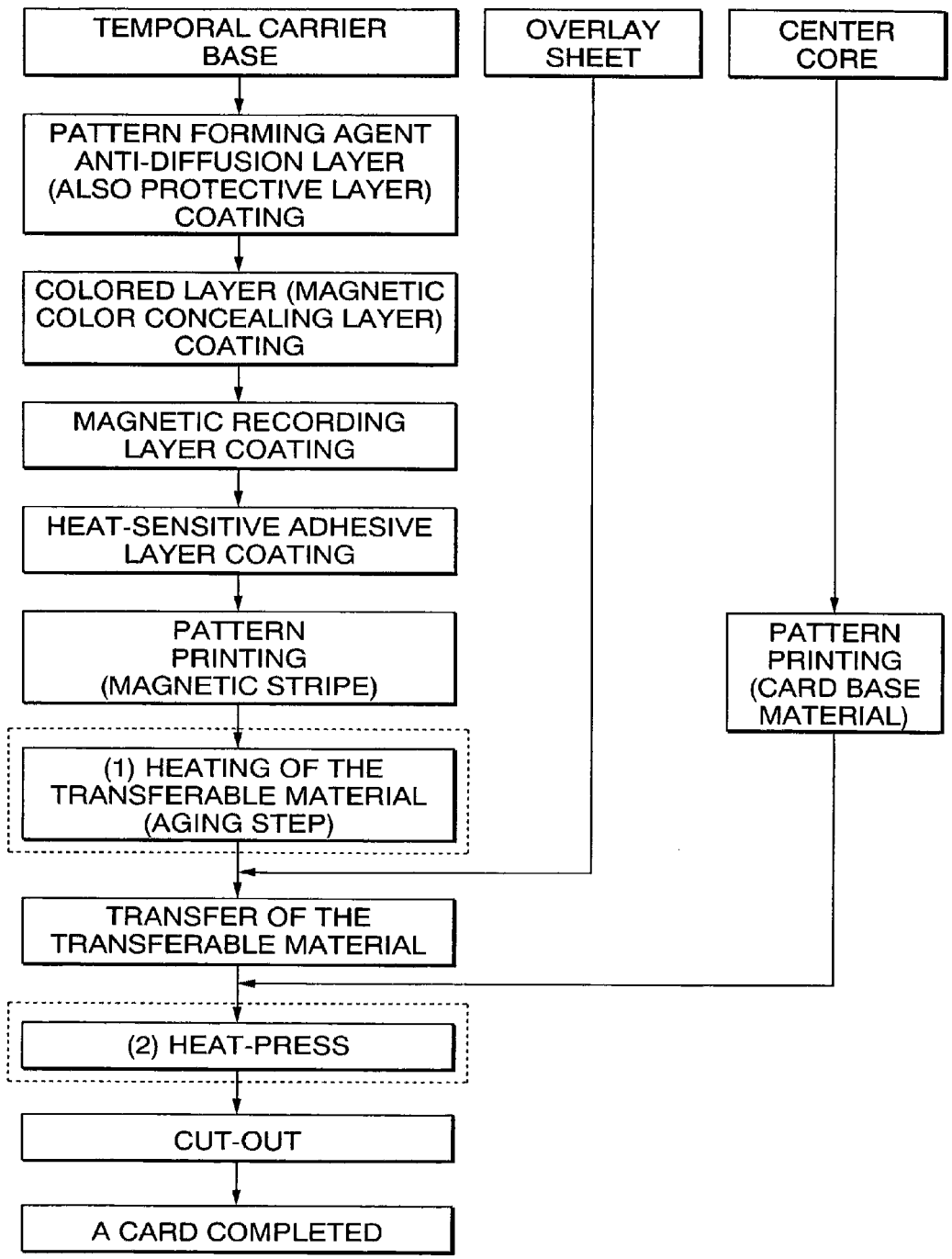
FIG. 9 is an illustration showing an embodiment of the process of producing a magnetic card using the method of producing the magnetic recording medium of the present invention.

A method of forming a pattern on a magnetic stripe forming transferable material first is described with reference to FIG. 2 and a flow sheet in FIG. 9 as an embodiment of the method of producing the magnetic recording medium of the present invention. FIG. 2 is a cross-sectional view of a transferable laminate used in the production method of the present invention. FIG. 9 shows the most advantageous case in terms of production efficiency because of a smaller number of steps from the pattern-formation to the card production in which a pattern is formed on the heat-sensitive adhesive layer although a pattern can be formed next to the magnetic recording layer in the transferable material. In this method, as shown in FIG. 2, a pattern-forming agent anti-diffusion layer 1 is provided on a temporal carrier base 9, a colored layer 3 is formed thereon, and a magnetic recording layer 4 and a heat-sensitive adhesive layer 5 are laminated in sequence to prepare a blank magnetic stripe transferable laminate. As soon as a pattern to be formed on the magnetic stripe is determined, the pattern is printed on the heat-sensitive adhesive layer of the transferable laminate to produce a transferable laminate capable of forming a pattern.

Figure 3:
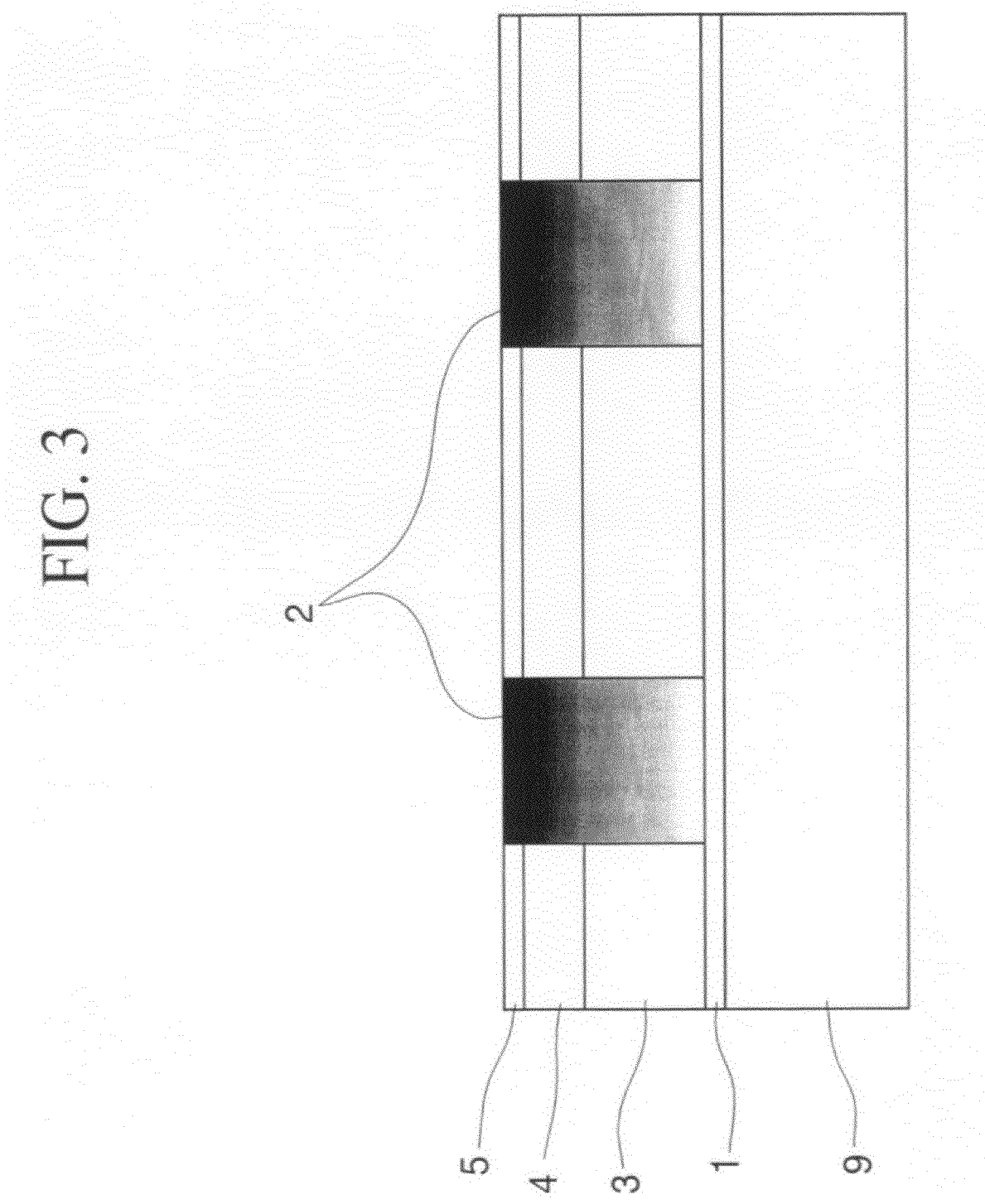
FIG. 3 is a cross-sectional view schematically showing the diffusion of a pattern-forming agent while the transferable laminate is in aging process.

The transferable laminate is heated (FIG. 9-(1)) so that the pattern-forming agent is diffused in the transferable laminate toward the temporal carrier base, which corresponds to the magnetic recording-reading side after the transfer. When it is released from the temporal carrier base and transferred to an overlay sheet of a base, the pattern is recognizable on the surface of the transferable material opposite to the base of the transferable material, namely on the magnetic recording-reading side surface (see FIG. 3).

Alternatively, in the heat-press process (FIG. 9-(2)) in which the overlay sheet to which the magnetic stripe transferable material is transferred is put together with the center core and the overlay sheet on the opposite side of the center core to integrate a card base, the magnetic stripe-forming transferable material is embedded in the overlay sheet and the pattern-forming agent is diffused toward the surface (the magnetic recording-reading side) of the transferred transferable material, whereby the formed pattern is recognizable on the magnetic stripe surface. The pattern-forming agent can be diffused only in the heat-press step that is essential for the magnetic card production. Here, it is preferable that the transferable laminate be subjected to the aging step (FIG. 9-(1)) in advance as well as the heat-press step because the pattern-forming agent can be more reliably diffused.

Figure 4:
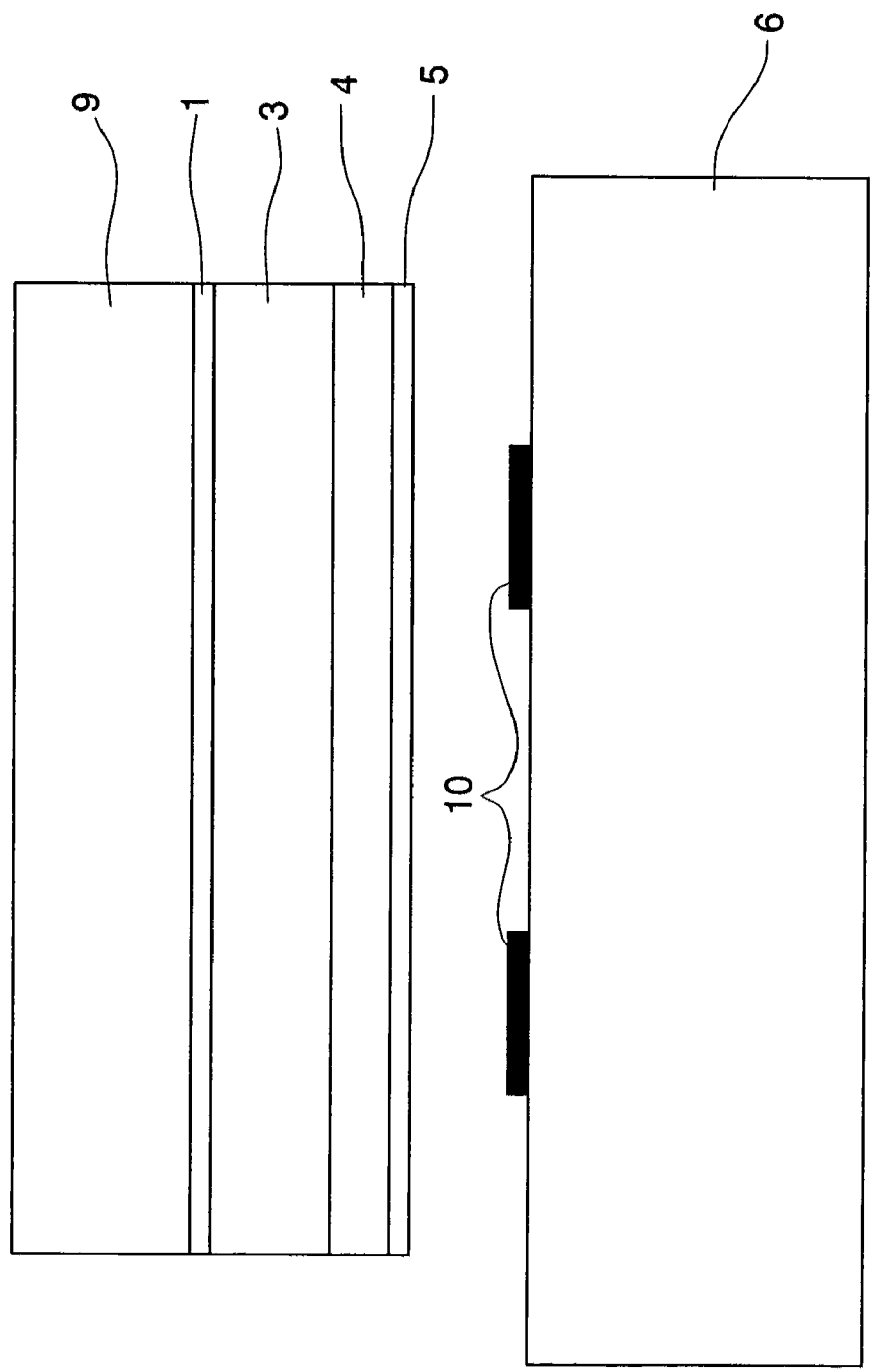
FIG. 4 is a cross-sectional view schematically showing an embodiment of the method of producing the magnetic recording medium of the present invention in which a colored layer part is formed on the overlay sheet base side.

A method of forming a pattern on a base, namely on a portion of the overlay sheet to which the magnetic stripe is transferred is described with reference to FIG. 4 and a flow sheet in FIG. 10 as another embodiment of the pattern forming method of the present invention. The method follows the flow sheet in FIG. 9 until the blank magnetic stripe transferable laminate is formed. However, when a pattern on the magnetic stripe is determined, the pattern is formed on the overlay sheet at the position where the magnetic stripe is transferred and, then, the magnetic stripe transferable material is transferred thereon. Subsequently, the overlay sheet is put together with the center core and further with the overlay sheet on the opposite side of the center core to integrate a card base in the heat-press step, whereby the magnetic stripe-forming transferable material is embedded in the card base. The pattern-forming agent of the formed pattern is diffused through the magnetic recording layer toward the surface (the magnetic recording-reading side) of the transferable material transferred on the overlay sheet, whereby the pattern becomes recognizable on the magnetic stripe surface.

Figure 5:
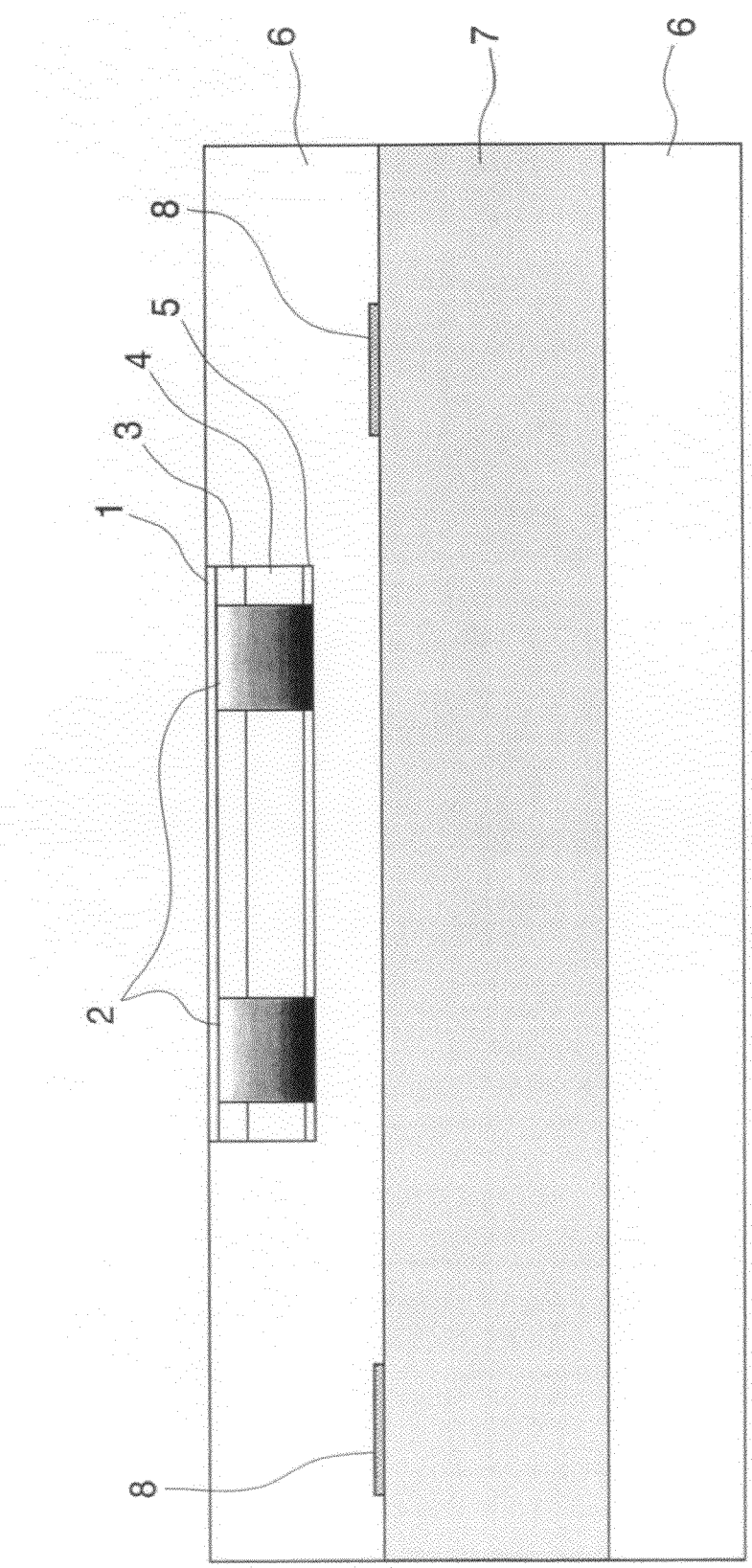
FIG. 5 is a cross-sectional view showing an embodiment of a magnetic card produced by way of the method of producing the magnetic recording medium of the present invention.

In the magnetic card produced as described above, as shown in the cross-sectional view of the magnetic stripe part (FIG. 5), the laminate of the magnetic stripe-forming transferable material is embedded in the overlay sheet 6 on the center core 7 with the pattern-forming agent anti-diffusion layer 1, which also serves as a protective layer, being exposed on the card surface. The magnetic card has pattern-forming agent diffused areas 2 in which the pattern-forming agent is diffused through the thickness of the colored layer 3, magnetic recording layer 4, and heat-sensitive adhesive layer 5 of the magnetic stripe-forming transferable material. The pattern-forming agent of the pattern 10 formed on the overlay sheet 6 in contact with the heat-sensitive adhesive layer 5 is diffused in the embedded laminate toward the magnetic recording-reading side and distributed toward the surface in the manner that there is an area having a density gradient which gradually declines. Therefore, the pattern is recognizable on the pattern-forming agent anti-diffusion layer 1 side.

The above-mentioned method in which the pattern is formed directly on the overlay sheet of a card base in advance allows the pattern to be printed on a magnetic card with higher positioning accuracy compared to the method in which the pattern is formed on the transferable laminate. Therefore, this method is preferably used for mass-producing a complex pattern requiring accurate positioning of the pattern and card base.

The magnetic card having a pattern on the magnetic stripe part can be produced in the above process. The pattern forming method used in the method of forming the magnetic recording medium of the present invention is applicable to some place on a magnetic card other than the magnetic stripe, magnetic recording media other than magnetic cards, and a laminate having no magnetic recording layer. In order to form a pattern in such cases, the magnetic recording layer is omitted, the other layers are added, or the magnetic recording layer is replaced with another functional layer in the flow sheets of FIGS. 9 and 10.

When a magnetic card is formed by using the magnetic stripe-forming transferable laminate as described above, only a part of the base of the magnetic card is covered with the magnetic stripe. However, a transferable laminate and transfer step covering the entire card base may be used to form a pattern spreading over the entire card surface.

The components of the transferable laminate used in the method of producing the magnetic recording medium of the present invention are described in detail hereafter in the order of production steps.

As shown in the cross-sectional view showing the structure of FIG. 2, the magnetic stripe-forming transferable laminate can be produced by forming on a temporal carrier base 9 a pattern-forming agent anti-diffusion layer 1 where necessary, a colored layer 3 where necessary, a magnetic recording layer 4 as an essential component, and a heat-sensitive adhesive layer 5 where necessary in sequence, which is an embodiment of the transferable laminate of the present invention. It is preferable that a pattern 10 is printed on the magnetic recording layer or on the heat-sensitive adhesive layer when it is provided.

In the transferable laminate used in the method of producing the magnetic recording medium of the present invention, any known conventional films can be used as the temporal carrier base, including polyesters such as polyethylene terephthalate, polyolefins such as polypropylene, cellulose derivatives such as cellulose triacetate, and other plastics such as polyamide. Among them, polyethylene terephthalate having tensile strength and heat resistance is preferable. The thickness of the temporal carrier base film is not particularly restricted. It is generally 3 to 100 μm and preferably 5 to 50 μm.

In the transferable laminate used in the method of producing the magnetic recording medium of the present invention, a pattern-forming agent anti-diffusion layer can be provided. The pattern-forming agent anti-diffusion layer prevents the pattern-forming agent of the pattern from being further diffused beyond the top layer after the pattern-forming agent is diffused by way of heating through the heat-sensitive adhesive layer, magnetic recording layer, and colored layer toward the magnetic recording-reading side of a formed magnetic card. It also prevents the pattern-forming agent from adhering to the heat-pressing metal plate during the heat-pressing process of the magnetic stripe-forming transferable material. The pattern-forming agent anti-diffusion layer further serves as a protective layer for the entire transferable material. It is preferable that the pattern-forming agent anti-diffusion layer is substantially transparent to light or electronic beams and the like for detecting the pattern so that the pattern formed by the pattern-forming agent diffused directly under the pattern-forming agent anti-diffusion layer is recognizable or the pattern-forming agent anti-diffusion layer transmits ultraviolet light emitted for visual check when the pattern is formed by a fluorescent agent.

As the binder resin constituting the pattern-forming agent anti-diffusion layer, although it varies with a type of a pattern-forming agent used therein, for example, cellulose resin, butyral resin, acryl resin, polyurethane resin, polyester resin, vinyl chloride resin such as copolymers of vinyl chloride and vinyl acetate with or without the addition of vinyl alcohol, maleic anhydride, or acrylic acid, epoxy resin, phenol resin, and melamine resin can be used. Among them, those having a glass transition point higher than the heating temperature and heat-press temperature of the transferable laminate for diffusing the pattern-forming agent are preferably used. The pattern-forming agent is presumably diffused through molecules. Therefore, a hardener such as a polyisocyanate compound can be preferably used to cross-link the binder resin molecules for preventing the diffusion. Also, it is preferable to use no fillers that tend to create voids in the layer. The hardener is also preferably used to improve the durability of the pattern-forming agent anti-diffusion layer also serving as a protective layer.

Particularly, when a dye is used as the pattern-forming agent, a hydrophilic resin having low compatibility and dyeing affinity to the dye is preferably used. Resins used in sublime dye anti-diffusion layers are preferably used. In consideration of adhesion to general thermoplastic resins, heat resistance, and water resistance, cellulose resins are preferable and, among them, nitrocellulose and cellulose acetate are more preferable.

The pattern-forming agent anti-diffusion layer can contain soybean lecithin, microsilica, wax or the like as a coating-modifier where necessary.

The solvent used in the paint for the pattern-forming agent anti-diffusion layer include, for example, ketones such as acetone, methyl ethyl ketone, and cyclohexanone, esters such as methyl acetate, ethyl acetate, and butyl acetate, alcohols such as ethanol, hydrocarbons such as hexane, toluene, and xylene. These solvents can be used alone or in combination of two or more.

The pattern-forming agent anti-diffusion layer can be obtained by applying the paint for the anti-diffusion layer prepared as described above on the temporal carrier base film using a known conventional technique such as the reverse, gravure, and die coatings.

It is advantageous that the pattern-forming agent anti-diffusion layer has a smaller dry thickness in terms of recording/reading properties. However, if it is excessively small, pores may be formed, through which the pattern-forming agent is possibly diffused. In such a case, the diffusion of the pattern-forming agent is not sufficiently prevented. In consideration of strength and durability, the thickness is preferably 0.1 to 5 μm and more preferably 0.3 to 2 μm.

The transferable laminate used in the method of producing the magnetic recording medium of the present invention can include a colored layer (concealing layer). The colored layer contains a binder resin and a coloring agent. It conceals the hue of the adjacent magnetic recording layer. In addition, the pattern-forming agent diffused through the colored layer is held within the colored layer and recognized with the hue of the colored layer in the background; therefore, the pattern is easily recognized and the design property is improved.

Pigments used for the coloring agent include, but not restricted to, inorganic pigments such as alumina, titanium oxide, chromium oxide, iron oxide, zinc oxide, and barium sulfate, organic pigments such as azo, phthalocyanine, quinacridone, perylene, anthraquinone, thioindigo, indanethrene, and many other pigments. Dyes such as phthalocyanine, azo, nitro, quinoline, methine, azine, and phthalein dyes can be used in place of or in combination with the above pigments.

Metal flakes can be used as the pigment that effectively conceals the hue of the magnetic recording layer. Usable metals include aluminum, gold, silver, copper, brass, titanium, chromium, nickel, nickel chrome, and stainless. Metal flakes can be prepared in the form of a plate using a ball mill or by peeling a metal deposited film. These are preferably shaped to a horizontal size of 5 to 25 μm and more preferably 10 to 15 μm and to a thickness of 0.1 to 1 μm.

The binder resin in the paint for colored layer can be known conventional binder resins. Alternatively, isocyanate compounds can be used for heat-curing. For easy diffusion of the pattern-forming agent, a binder resin having a Tg lower than the temperature to which the transferable material is heated for diffusing the pattern-forming agent is preferably used in the colored layer among polyimide resin, polyamide resin, rosin-modified maleic acid resin, polystyrene resin, shellac, alkyd resin and the like in addition to the binder resins described for the pattern-forming agent anti-diffusion layer.

In this way, the pattern-forming agent of the pattern can be diffused through the colored layer toward the magnetic recording-reading side, namely the transferred transferable material surface.

The diffusion rate and difficulty varies depending on the type of the resin used in the colored layer and can be adjusted by appropriately selecting the temperature to which the transferable material is heated and the resin used in the colored layer.

The solvent used in the paint for the colored layer can be known conventional solvents and, for example, the solvents described above for the protective layer can be used.

As for the formation of the colored layer, one or multiple coloring agents are mixed into a binder resin and a solvent for dissolving the binder resin, and dispersed by using a known conventional technique such as two-roll mill, three-roll mill, ball mill, sand mill, and dispersion to prepare a paint for the colored layer. Then, a colored layer can be obtained by applying and drying the paint using a known convention technique such as the reverse, gravure, and die coatings.

The colored layer preferably has a thickness enough to conceal the brown or black color of the magnetic recording layer. However, if the colored layer has an excessively large thickness, the spacing loss is increased and the reading output property is deteriorated, increasing the possibility of reading errors during data reading. Therefore, it is preferable that the colored layer has a thickness of 2 to 5 μm and particularly 3 to 4 μm.

The magnetic recording layer of the transferable laminate used in the method of producing the magnetic recording medium of the present invention can be prepared, for example, by applying a paint for the magnetic recording layer, which contains magnetic powder, a binder resin, and a solvent for dissolving the binder resin, on a temporal carrier base directly, via a pattern-forming agent anti-diffusion layer, or via a pattern-forming agent anti-diffusion layer and a colored layer.

The magnetic powder contained in the magnetic recording layer can be known magnetic powder such as γ-iron oxide, magnetite, cobalt-adhered iron oxide, chromium dioxide, iron-based metal magnetic powder, barium ferrite, and strontium ferrite. Those having a coercivity of 20 to 320 kA/m are preferable.

The binder resin in the magnetic recording layer can be a known conventional binder resin. For example, the binder resins described for the colored layer can be used in general. Alternatively, isocyanate compounds can be used for heat-curing. As the solvent used in the paint for the magnetic recording layer, the solvents described for the protective layer can generally be used.

The pattern-forming agent in the pattern-forming layer can be diffused through the magnetic recording layer toward the magnetic recording-reading side, namely the transferred transferable material surface. The diffusion rate and difficulty varies depending on the type of the resin and can be adjusted by appropriately selecting the temperature to which the transferable material is heated and the resin used in the magnetic recording layer. For easy diffusion of the pattern-forming agent, the binder resin in the magnetic recording layer preferably has a Tg lower than the temperature to which the transferable material is heated.

The magnetic paint can contain additives such as surfactants, silane coupling agents, plasticizers, wax, and silicone oil, and carbon black and other fillers where necessary.

The paint for the magnetic recording layer can be obtained by kneading and dispersing the above magnetic powder, binder resin, and solvent using a known conventional technique. For example, two-roll mill, three-roll mill, ball mill, henschel mixer, cobol mill, sand mill, disper, homogenizer, and kneader can be used for the kneading and dispersing.

The application method of the paint for the magnetic recording layer is not particularly limited. Known convention application techniques can be used. A predetermined amount of magnetic coating material is applied, subject to an orientation process in which the direction where the magnetic powder is easily magnetized is aligned with the longitudinal direction of the application of the magnetic recording layer, and dried. The application can be done, for example, using the gravure, reverse, transfer roll coater, kiss coater, or die coater processes.

After the application using the above techniques, it is preferable in terms of the recording/reading properties that the magnetic field orientation be conducted before the coating is dried. The magnetic field orientation can be conducted using a known technique such as use of a repulsive opposing permanent magnet and a solenoidal electromagnet. The magnetic field intensity is preferably within a range of 1000 to 6000 G.

The magnetic recording layer preferably has a dry thickness of 2 to 50 μm and more preferably 5 to 20 μm.

The transferable laminate used in the method of producing the magnetic recording medium of the present invention can be provided with a heat-sensitive adhesive layer for better adhesion between the transferable laminate and a card base. The heat-sensitive adhesive layer generally contains a heat-sensitive adhesive resin. For example, vinyl chloride resin such as copolymers of vinyl chloride and vinyl acetate with or without the addition of vinyl alcohol, maleic anhydride, acrylic acid or the like, polyester resin, acrylic resin, polyimide resin, and polyurethane resin can be mentioned.

Also, for example, the solvents described for the protective layer can be used as the solvent in the heat-sensitive adhesive layer. A heat-sensitive adhesive resin is dissolved in a solvent, and a paint for heat-sensitive adhesive is prepared by way of mixing and stirring. Then, a heat-sensitive adhesive layer can be obtained by applying and drying the paint for heat-sensitive adhesive on the magnetic recording layer using a known technique such as the reverse, gravure, die coating processes.

It is preferable that the heat-sensitive adhesive layer has a thickness of 0.5 to 15 μm and particularly 0.5 to 5 μm.

The pattern-forming agent can be diffused through the heat-sensitive adhesive layer toward the magnetic recording-reading side, namely the transferable material surface. The diffusion rate and difficulty varies depending on the type of the resin in the heat-sensitive adhesive layer and can be adjusted by appropriately selecting the temperature to which the transferable material is heated and the resin used in the heat-sensitive adhesive layer. For easy diffusion of the pattern-forming agent, the binder resin in the heat-sensitive adhesive layer preferably has a Tg lower than the temperature to which the transferable material is heated.

The pattern is formed on the transferable laminate used in the method of producing the magnetic recording medium of the present invention by printing of the following pattern-forming ink when the pattern-forming agent is a coloring agent. The pattern-forming ink contains a binder resin, a coloring agent, and a solvent. The coloring agent in the pattern-forming ink can be easily diffusible ones selected from known dyes and pigments. Dyes are preferable because of their thermal diffusion property, and known dyes used in various coloring fields can be used. For example, monoazo, diazo, metal complex salt, anthraquinone, phthalocyanine, toriallyl methane, or perylene oil-soluble dyes are preferably used. Known sublime dyes can also be used. However, in the production method of the present invention, the pattern-forming agent is diffused at a sufficient temperature for a sufficient time in the heat-pressing process of the magnetic recording medium production. Therefore, there is not always need of excellent sublimation property required for general sublime dyes where quick diffusion is desired. It is rather preferable to use non-sublime dyes with the emphasis on the stability of the coloring agent.

The binder resin used in the pattern-forming ink can be known conventional binder resins. For example, the resins used in the pattern-forming agent anti-diffusion layer, colored layer, magnetic recording layer, and heat-sensitive adhesive layer can be used. The binder resin that exhibits excellent adhesion to the card overlay sheet base and does not interfere with the adhesion of the heat-sensitive adhesive layer to the overlay sheet after the pattern is formed on the heat-sensitive layer is preferably used. The binder resins used in the heat-sensitive adhesive layer, exhibiting excellent adhesion to the overlay sheet can preferably be used.

The solvent used in the pattern-forming ink can be known conventional solvents. For example, the solvents described above for the pattern-forming agent anti-diffusion layer, colored layer, magnetic recording layer, and heat-sensitive adhesive layer can be used.

The pattern-forming ink can be prepared by dissolving one or multiple pattern-forming agents into a binder resin and a solvent for dissolving the binder resin or by dispersing them with a known conventional dispersion apparatus such as two-roll mill, three-roll mill, ball mill, sand mill, and disper. The pattern can be printed by way of a known printing technique such as the gravure, flexographic, offset, screen, and inkjet printing methods. The gravure printing is suitable particularly in terms of printing quality and productivity.

The thickness of the pattern print is not particularly limited. However, in general, the magnetic stripe-forming transferable material is wound up in a reel and therefore, when the thickness is excessively large, the level-difference due to the difference in thickness between the non-printed area and the printed area is enhanced while the transferable material is wound up, causing the transferable material to be deformed. This may deteriorate the adhesion between the magnetic stripe-forming transferable material and the base. Hence, it is preferable that the thickness is 0.5 to 5 μm and particularly 0.5 to 2.0 μm.

In this way, a pattern is formed using the pattern-forming ink, for example, on the heat-sensitive adhesive surface of the magnetic stripe-forming transferable material or on the area of a card base to which the magnetic stripe is transferred.

With regard to the method of diffusing the pattern formed as described above in the transferable material, the transferable material present on the temporal carrier base is allowed to stand at higher temperatures of 40 to 80° C. for several hours to several days to diffuse the pattern-forming agent toward the temporal carrier base side before the transfer process, whereby the pattern is recognizable on the surface of the transferable material opposite to the base after the transferable material is transferred. Alternatively, when heat-pressing is used to produce a magnetic card, the transferable material is transferred to the overlay sheet of a card base, placed between heat-pressing metal plates together with the center core and the overlay sheet on the opposite side, heat-pressed at 100 to 160° C. for several tens minutes to several hours to diffuse the pattern-forming agent toward the transferred transferable material surface, whereby the pattern is recognizable on the completed magnetic card surface.

When the pattern-forming agent is a fluorescent agent, the method of producing the magnetic recording medium of the present invention can be realized by printing of the following fluorescent pattern-forming ink. The fluorescent pattern-forming ink of the present invention contains a binder resin and a fluorescent agent.

The fluorescent agent in the fluorescent pattern-forming ink can include an extensive range of known organic fluorescent substances. Specifically, preferable organic fluorescent substances include benzoxazole thiophyne type, diaminostilbene type, imidazole type, coumarin type, naphthalimido type, and rare-earth complex fluorescent type dyes because of their excellent diffusivity. Usable commercial fluorescent substances include a trade name "UVITEX OB" produced by Chiba Special Chemicals Co., Ltd., "Kayalight OS" produced by Nippon Kayaku Co., Ltd., "Thermoplast series", "Fluorol series", and "Lumogen series" produced by BASF, and "Lumicolor" produced by Recording Materials Research Institute K.K. Fluorescent dyes are preferably used because they are readily diffusible.

The fluorescent pattern-forming ink using the above fluorescent agents can be prepared in the same manner as the above described pattern-forming ink except that the fluorescent agents are used in place of the chromatic coloring agents. When the pattern-forming agent is prepared using luminous, infrared, or other dyes or pigments for functional ink, a functional ink can be prepared using these dyes or pigments for functional ink in place of the above described coloring agent or fluorescent agent to form a pattern on the magnetic recording medium.

These pattern-forming agents may be used, for example, in combination with a coloring agent and a fluorescent agent or further in combination with another functional ink.

EXAMPLES

The present invention is described in more detail hereafter using examples and comparative examples. However, the present invention is not limited to these examples. The term "parts" means "parts by mass" hereafter.

Examples using chromatic dyes or fluorescent dyes as the coloring agent in the pattern-forming agent are described hereafter.

The following temporal carrier base film and paints are used in the examples and comparative examples.

A. Temporal Carrier Base Film: Polyethylene Terephthalate Film Having a Thickness of 24 μm;

B. Preparation of the Paint for the Pattern-Forming Agent Anti-Diffusion Layer (Also Serving as a Protective Layer)

| | |
|---|---|
| cellulose acetate resin | 8 parts |
| ("L-20" produced by Daicel Chemical Industries; Tg: 187° C.) | |
| cellulose acetate propionate resin | 2 parts |
| ("CAP-504-0.2" produced by Eastman Chemical; Tg: 159° C.) | |
| acetone | 25 parts |
| ethyl acetate | 25 parts |
| toluene | 20 parts |
| cyclohexanone | 20 parts |
| polyisocyanate | 4 parts |
| ("Hardener No. 50 (active ingredients: 50%)" produced by Dainippon Ink and Chemicals, Inc.) | |

The above materials except for polyisocyanate were stirred and sufficiently dissolved using a disper. Then, the polyisocyanate was added thereto, and this was further stirred and homogenized using disper to prepare a paint for the anti-dispersion layer of a pattern-forming agent.

C. Preparation of the Paint for the Colored Layer

| | |
|---|---|
| metal flakes: aluminum powder | 20 parts |
| ("210EA" produced by Showa Aluminum Powder K.K.) | |
| vinyl chloride-vinyl acetate copolymer resin | 16 parts |
| ("VAGH" produced by Union Carbide Corporation; Tg: 79° C.) | |
| polyurethane resin | 4 parts |
| ("TS-03" produced by Dainippon Ink and Chemicals, Inc.; Tg: −30° C.) | |
| methyl ethyl ketone | 75 parts |
| toluene | 75 parts |
| cyclohexanone | 17 parts |
| polyisocyanate | 5 parts |
| ("Hardener No. 50 (active ingredients: 50%)" produced by Dainippon Ink and Chemicals, Inc.) | |

The above materials except for polyisocyanate were stirred and sufficiently dissolved using a disper. Then, the polyisocyanate was added thereto, and this was further stirred and homogenized using the disper to prepare a paint for the colored layer.

D. Preparation of the Paint for the Magnetic Recording Layer

| | |
|---|---|
| barium ferrite magnetic powder | 100 parts |
| ("MC-127" produced by Toda Kogyo Corp.; coercive force 220 kA/m) | |
| vinyl chloride-vinyl acetate copolymer resin | 15 parts |
| ("MR-110" produced by Zeon Corporation; Tg: 70° C.) | |
| polyurethane resin | 10 parts |
| ("TS-03" produced by Dainippon Ink and Chemicals, Inc.) | |
| MEK | 50 parts |
| toluene | 50 parts |
| cyclohexanone | 25 parts |
| polyisocyanate | 10 parts |
| ("Hardener No. 50 (active ingredients: 50%)" produced by Dainippon Ink and Chemicals, Inc.) | |

The above materials were used in the method disclosed in the Japanese Unexamined Patent Application, Publication No. H09-059541 to prepare a paint for the magnetic recording layer.

E. Preparation of the Paint for the Heat-Sensitive Adhesive Layer

| | |
|---|---|
| polyurethane resin | 1 part |
| ("TS-03" produced by Dainippon Ink and Chemicals, Inc.) | |
| vinyl chloride-vinyl acetate copolymer resin | 4 parts |
| ("Solbine C5" produced by Nisshin Chemical Industry Co. Ltd.; Tg: 68° C.) | |
| MEK | 45 parts |
| toluene | 50 parts |

The above materials were stirred, sufficiently dissolved, and homogenized using a disper to prepare a paint for the heat-sensitive adhesive layer.

F. Preparation of a Pattern-Forming Ink [A]

| | |
|---|---|
| Amine salt of a chromium complex salt dye <C.I. Solvent Black 43> | 4 parts |
| ("Eisenspiron Black GMH Special" produced by Hodogaya Chemical Co., Ltd.) | |
| polyurethane resin | 2 parts |
| ("TS-03" produced by Dainippon Ink and Chemicals, Inc.) | |
| vinyl chloride-vinyl acetate copolymer resin | 8 parts |
| ("Solbine C5" produced by Nisshin Chemical Industry Co., Ltd.) | |
| MEK | 43 parts |
| toluene | 43 parts |

The above materials were stirred, sufficiently dissolved, and homogenized using a disper to prepare a pattern-forming ink [A].

G. Preparation of a Pattern-Forming Ink [B]

| | |
|---|---|
| copper phthalocyanine dye <C.I. Solvent Blue 70> | 4 parts |
| ("Neozapon Blue 807" produced by BASF) | |
| polyurethane resin | 2 parts |
| ("TS-03" produced by Dainippon Ink and Chemicals, Inc.) | |
| vinyl chloride-vinyl acetate copolymer resin | 8 parts |
| ("Solbine C5" produced by Nisshin Chemical Industry Co., Ltd.) | |
| MEK | 43 parts |
| toluene | 43 parts |

The above materials were stirred, sufficiently dissolved, and homogenized using a disper to prepare a pattern-forming ink [B].

H. Preparation of a Pattern-Forming Ink [C]

| | |
|---|---|
| carbon black | 10 parts |
| ("REGAL99R" produced by CABOT CORPORATION) | |
| vinyl chloride-vinyl acetate copolymer resin | 8 parts |
| ("VAGH" produced by Union Carbide Corporation) | |
| polyurethane resin | 2 parts |
| ("TS-03" produced by Dainippon Ink and Chemicals, Inc.) | |
| MEK | 40 parts |
| toluene | 40 parts |
| polyisocyanate | 4 parts |
| ("Hardener No. 50 (active ingredients: 50%)" produced by Dainippon Ink and Chemicals, Inc.) | |

The carbon black and vinyl chloride-vinyl acetate copolymer resin were pre-kneaded in a two-roll mill and then passed through a sand mill together with the other materials to prepare a pattern-forming ink [C].

I. Preparation of a Pattern-Forming Ink [D]

| | |
|---|---|
| copper phthalocyanine pigment | 10 parts |
| vinyl chloride-vinyl acetate copolymer resin | 8 parts |
| ("VAGH" produced by Union Carbide Corporation) | |
| polyurethane resin | 2 parts |
| ("TS-03" produced by Dainippon Ink and Chemicals, Inc.) | |
| MEK | 40 parts |
| toluene | 40 parts |
| polyisocyanate | 4 parts |
| ("Hardener No. 50 (active ingredients: 50%)" produced by Dainippon Ink and Chemicals, Inc.) | |

The copper phthalocyanine pigment and vinyl chloride-vinyl acetate copolymer resin were pre-kneaded in a two-roll mill and then passed through a sand mill together with the other materials to prepare a pattern-forming ink [D].

J. Preparation of the Non-Patterned Area Filler Ink

| | |
|---|---|
| metal flakes: aluminum powder | 20 parts |
| ("210EA" produced by Showa Aluminum Powder K.K.) | |
| vinyl chloride-vinyl acetate copolymer resin | 16 parts |
| ("VAGH" produced by Union Carbide Corporation) | |
| polyurethane resin | 4 parts |
| ("TS-03" produced by Dainippon Ink and Chemicals, Inc.) | |
| methylethylketone | 75 parts |
| toluene | 75 parts |
| cyclohexanone | 17 parts |
| polyisocyanate | 5 parts |
| ("Hardener No. 50 (active ingredients: 50%)" produced by Dainippon Ink and Chemicals, Inc.) | |

The above materials except for polyisocyanate were stirred and sufficiently dissolved using a disper. Then, the polyisocyanate was added thereto, and further stirred and homogenized using the disper to prepare a non-patterned area filler ink.

K. Preparation of a Fluorescent Pattern-Forming Ink [A]

| | |
|---|---|
| fluorescent substance [A] | 2 parts |
| ("UVITEX OB" produced by Ciba Specialty Chemicals) | |
| polyurethane resin | 2 parts |
| ("TS-03" produced by Dainippon Ink and Chemicals, Inc.) | |
| vinyl chloride-vinyl acetate copolymer resin | 8 parts |
| ("Solbine C5" produced by Nisshin Chemical Industry Co., Ltd.) | |
| MEK | 44 parts |
| toluene | 44 parts |

The above materials were stirred, sufficiently dissolved, and homogenized using a disper to prepare a fluorescent pattern-forming ink [A].

L. Preparation of a Fluorescent Pattern-Forming Ink [B]

| | |
|---|---|
| fluorescent substance [B] | 2 parts |
| ("Lumogen F Violet 570" produced by BASF) | |
| polyurethane resin | 2 parts |
| ("TS-03" produced by Dainippon Ink and Chemicals, Inc.) | |
| vinyl chloride-vinyl acetate copolymer resin | 8 parts |
| ("Solbine C5" produced by Nisshin Chemical Industry Co., Ltd.) | |
| MEK | 44 parts |
| toluene | 44 parts |

The above materials were stirred, sufficiently dissolved, and homogenized using a disper to prepare a fluorescent pattern-forming ink [B].

Examples and comparative examples using chromatic dyes as the pattern-forming agent are described hereafter.

Example 1

A polyethylene terephthalate film having a thickness of 24 μm was used as the temporal carrier base. The above described paints for a pattern-forming agent anti-diffusion layer, colored layer, magnetic recording layer, and heat-sensitive adhesive layer were applied and dried on one surface of the film in this order using a reverse coater to form a pattern-forming agent anti-diffusion layer, colored layer, magnetic recording layer, and heat-sensitive adhesive layer, respectively. The pattern-forming agent anti-diffusion layer had a dry thickness of 1 μm; the colored layer, 4 μm; the magnetic recording layer, 9 μm; and the heat-sensitive adhesive layer, 1.5 μm.

Figure 6:
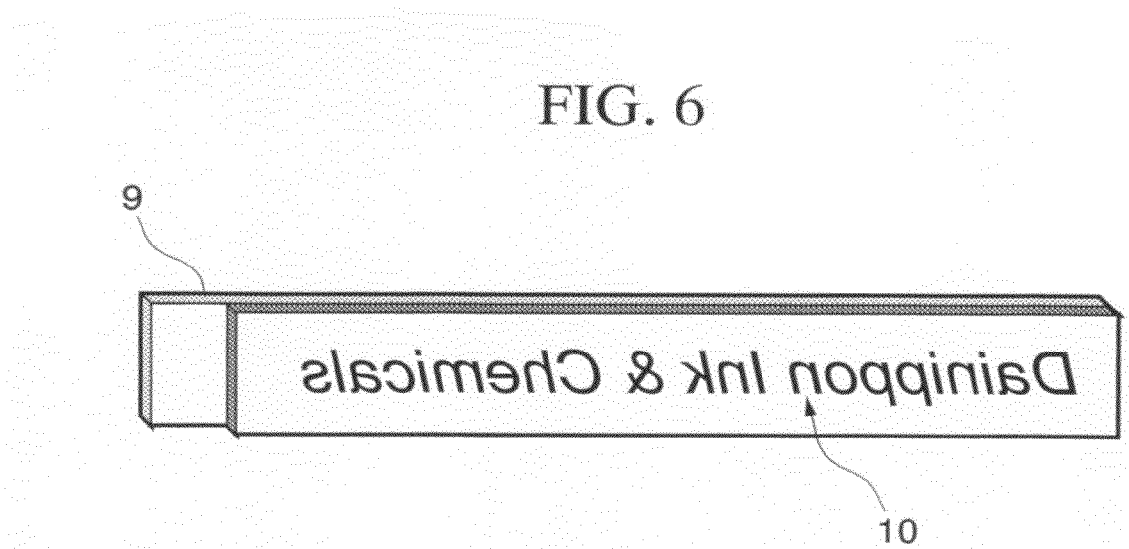
FIG. 6 is an illustration schematically showing the magnetic stripe-forming transferable laminate produced in Examples 1 to 4 and the pattern formed on the transferable laminate.

A pattern was printed on the heat-sensitive adhesive layer of the transferable material prepared above by way of the gravure printing using the pattern-forming ink [A] as shown in FIG. 6, such that the portion of the printed pattern had a thickness of 1 μm. It was then allowed to stand in a constant temperature room at 60° C. for 24 hours to diffuse the coloring agent in the pattern through the heat-sensitive adhesive layer, magnetic recording layer, and colored layer toward the temporal carrier base of the transferable laminate.

Figure 8:
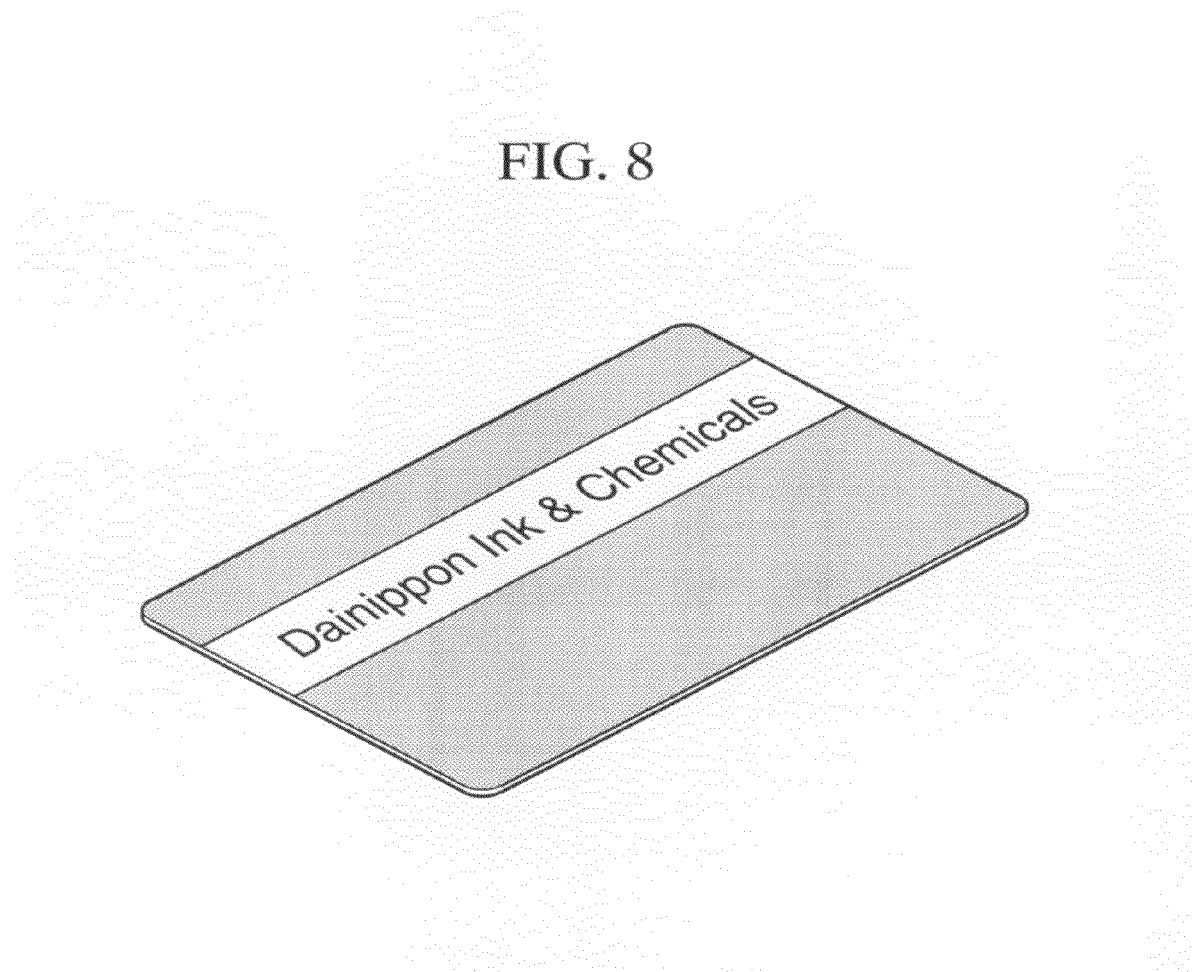
FIG. 8 is an illustration schematically showing an embodiment of a magnetic card having a pattern formed by way of the method of producing the magnetic recording medium of the present invention.

After the magnetic stripe-forming transferable laminate prepared above was cut to obtain the transferable material of a specific width, the transferable material was transferred to a polyvinyl chloride card base overlay sheet (produced by Taihei Chemical Limited.) using a heat seal tester (produced by Tester Sangyo). Then, the temporal carrier base was removed. The overlay sheet was heat-pressed together with the card base center core and another overlay sheet on the opposite side using a platen pressing machine (a laboratory vulcanizing pressing machine (produced by Toyo Seiki Seisaku-sho, Ltd.)) at 140° C. and 1.3 MPa for 20 to 30 minutes. Then, it was cut out to a card to produce a magnetic card shown in FIG. 8.

Example 2

A magnetic card was produced in the same manner as Example 1 except that the pattern-forming ink in the pattern printing of Example 1 was replaced with the pattern-forming ink [B].

Example 3

A magnetic card was produced in the same manner as Example 1 except that the standing of the magnetic stripe-forming transferable laminate in a constant temperature room at 60° C. for 24 hours after the pattern-printing in Example 1 was eliminated.

Example 4

A magnetic card was produced in the same manner as Example 2 except that the standing of the magnetic stripe-forming transferable laminate in a constant temperature room at 60° C. for 24 hours after the pattern-printing in Example 2 was eliminated.

Example 5

Figure 7:
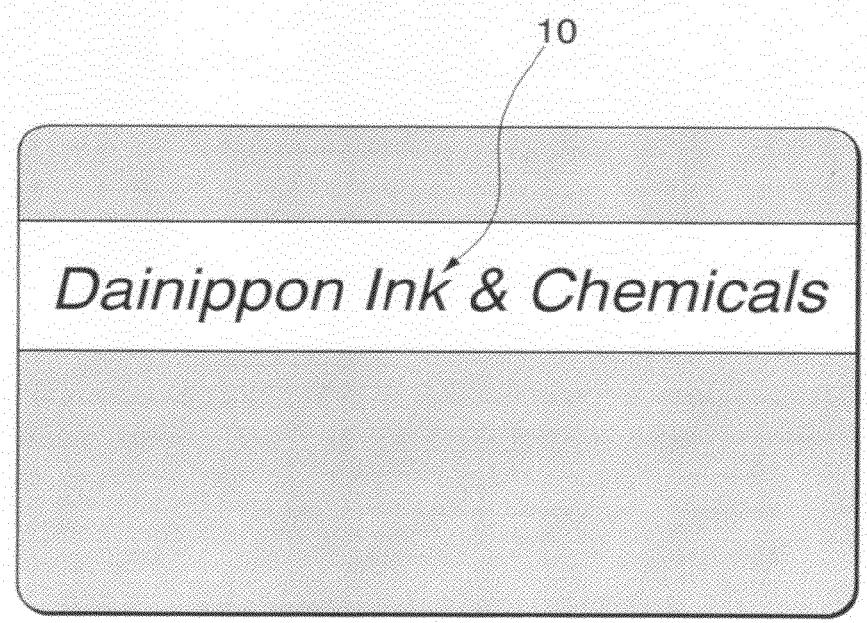
FIG. 7 is an illustration schematically showing the area where the pattern is formed in Examples 5 and 6.

A magnetic stripe-forming transferable material was prepared in the same manner as in Example 1, and the pattern was printed on the area of the overlay sheet (i.e. an area of the card base where the magnetic stripe was to be transferred) by way of the gravure printing using the pattern-forming ink [A] as shown in FIG. 7. Then, a magnetic card was produced in the same manner as the magnetic card production process of Example 1.

Example 6

A magnetic card was produced in the same manner as Example 5 except that the pattern-forming ink in the pattern printing of Example 5 was replaced with the pattern-forming ink [B].

Comparative Example 1

A polyethylene terephthalate film having a thickness of 24 μm was used as the temporal carrier base film. The above described paint for the pattern-forming agent anti-diffusion layer (protective layer) was applied on one surface of the film using a reverse coater to a dry thickness of 1 μm.

Then, a pattern was formed by way of the gravure printing using the pattern-forming ink [C] to a dry thickness of 1 μm. Subsequently, the paint for non-patterned area filler was applied to the area where the pattern was not formed by the pattern-forming ink [C] using a gravure cylinder that has the negative pattern of the above pattern to a dry thickness 1 μm.

Then, the paints for the colored layer, the magnetic recording layer, and the heat-sensitive adhesive layer were applied and dried in this order using a reverse coater to form a colored layer, magnetic recording layer, and heat-sensitive adhesive layer, respectively. The colored layer had a dry thickness of 4 μm; the magnetic recording layer, 9 μm; and the heat-sensitive adhesive layer, 1.5 μm.

After the magnetic stripe-forming transferable laminate prepared above was cut to a specific width, the transferable material was transferred to a polyvinyl chloride card base overlay sheet (produced by Taihei Chemical Limited) using a heat seal tester (produced by Tester Sangyo). Then, the temporal carrier base was removed. The overlay sheet was heat-pressed together with the card base center core and another overlay sheet on the opposite side using a platen pressing machine (a laboratory vulcanizing pressing machine (produced by Toyo Seiki Seisaku-sho, Ltd.)) at 140° C. and 1.3 MPa for 20 to 30 minutes. Then, it was cut out to a card to produce a magnetic card.

Comparative Example 2

A magnetic card was produced in the same manner as Comparative Example 1 except that the pattern-forming ink in Comparative Example 1 was replaced with the pattern-forming ink [D].

Comparative Example 3

A magnetic card was produced in the same manner as Comparative Example 1 except that the filling of the non-patterned area with the paint for non-patterned area filler Comparative Example 1 was eliminated.

The magnetic cards of Examples 1 through 6 and Comparative Examples 1 through 3 were evaluated as follows.
(Pattern Stability)

After stored in a constant temperature room at 60° C. for 1000 hours, changes in the color and contour of the patterns on the magnetic cards were observed. The patterns on the magnetic cards produced in Examples 1 through 6 had no changes and maintained the initial color and contour.

(Design Property)

The magnetic stripe parts of the magnetic cards were visually evaluated.

○ . . . good contrast and color;

Δ . . . blurred contrast or dull color; or x . . . blurred contrast and dull color (Output Fluctuations of the Magnetic Cards)

The magnitude of level-difference or roughness of a magnetic card as a laminate was evaluated by measuring reading output-fluctuations due to the surface roughness of a magnetic card.

The recording/reading properties of the obtained magnetic cards were measured using "MAGTESTER 2000" produced by Barnes International Ltd. based on ISO/ICE 7811-6 and the output fluctuations were obtained using the equation below. As for the magnetic stripe on the magnetic cards used for producing the sample magnetic cards, the thickness of the magnetic recording layer was adjusted according to their spacing so that the average output is equal to the standard card output.

Output fluctuation (%)=((maximum output value−minimum output value)/average output value)×100

○ . . . less than 5%;

Δ . . . not less than 5% and less than 10%; or x . . . not less than 10%.

(Delivery Period after a Pattern is Determined and Easiness to Modify a Pattern)

Figure 10:
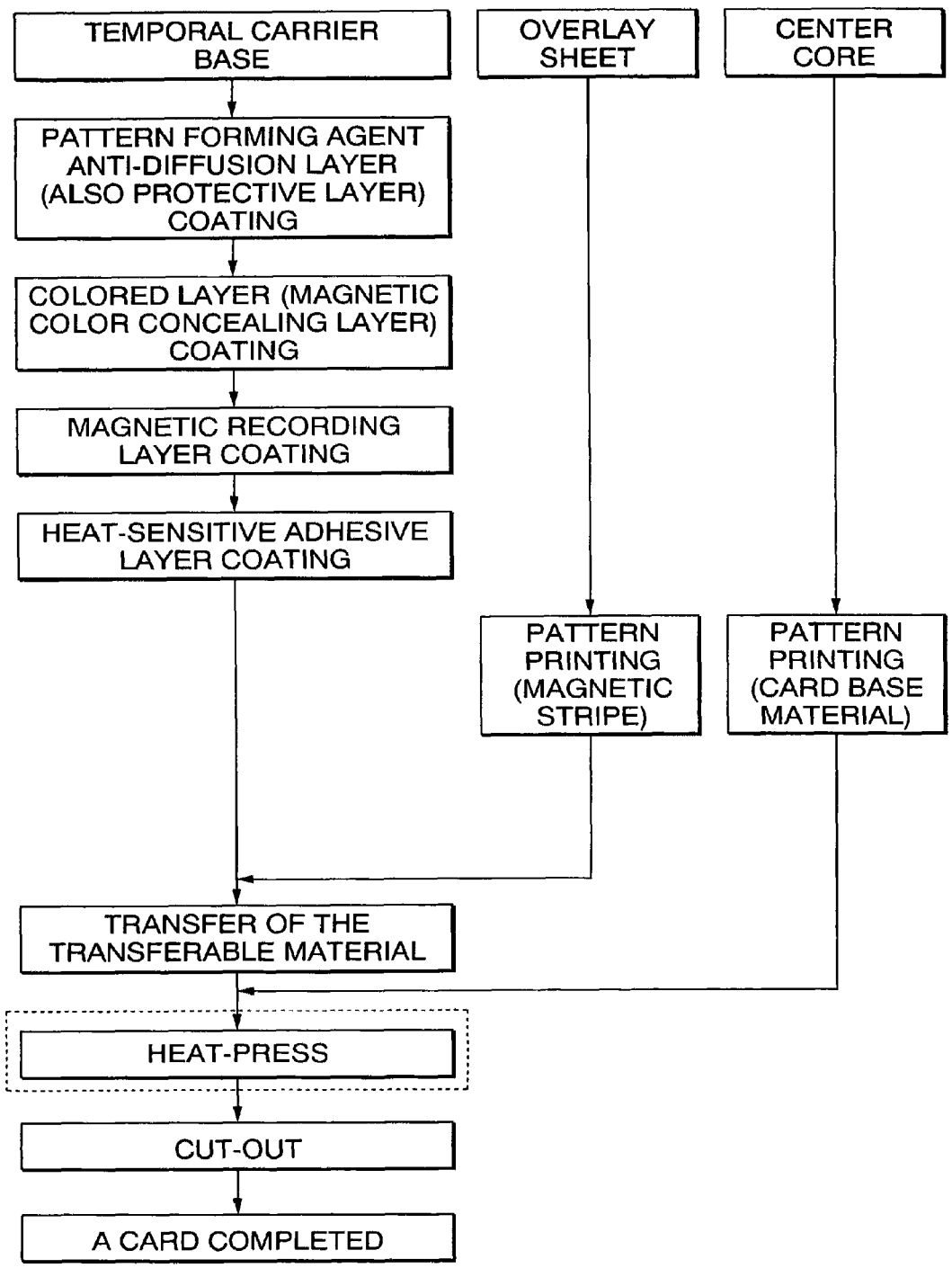
FIG. 10 is an illustration showing another embodiment of the process of producing a magnetic card using the method of producing the magnetic recording medium of the present invention.
Figure 11:
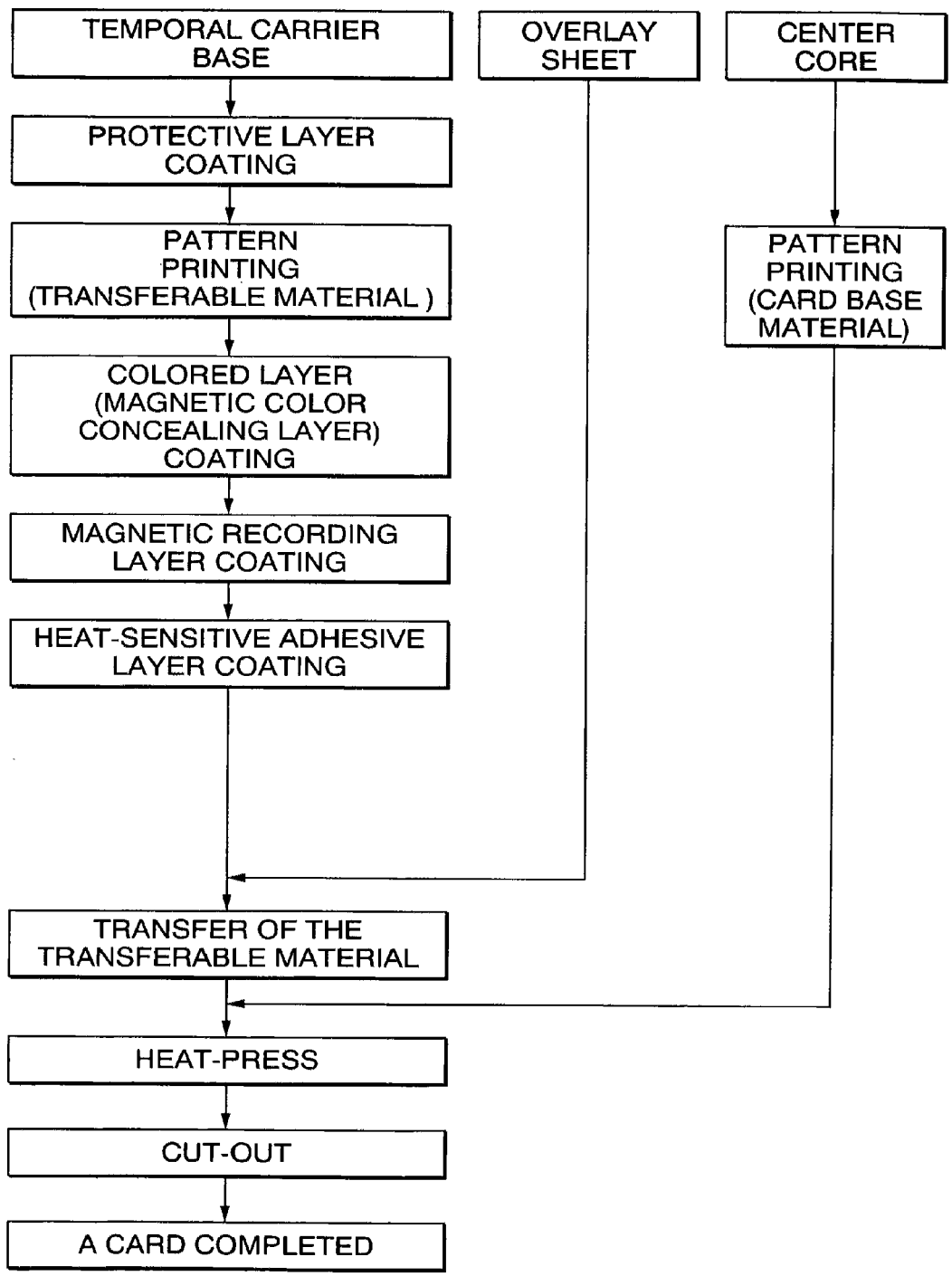
FIG. 11 is an illustration showing the prior art method of producing a magnetic card having a magnetic recording layer and a pattern.

The number of steps to complete a card was used (see FIGS. 9, 10, and 11).

○ . . . the number of steps from the pattern-formation to the completion of a card is as small as 4 or lower and quick response to card delivery and pattern-modifications is available;

x . . . the number of steps from the pattern-formation to the completion of a card is 7 or higher and quick response to card delivery and pattern-modifications is not available;

Δ . . . the number of steps from the pattern-formation to the completion of a card is 5 to 6.

The results are given in Table 1.

TABLE 1

| | Desgin property | Output fluctuations | The number of steps from the pattern-formation to the completion of a card | Easiness of response to delivery and pattern-modifications |
|---|---|---|---|---|
| Example 1 | ○ | ○ | 4 | ○ |
| Example 2 | ○ | ○ | 4 | ○ |
| Example 3 | ○ | ○ | 3 | ○ |
| Example 4 | ○ | ○ | 3 | ○ |
| Example 5 | ○ | ○ | 4 | ○ |
| Example 6 | ○ | ○ | 3 | ○ |
| Comparative Example 1 | ○ | Δ | 7 | x |
| Comparative Example 2 | ○ | Δ | 7 | x |
| Comparative Example 3 | ○ | x | 6 | Δ |

As apparent from the results in Table 1, Examples 1 through 6 ensured the same design property as the prior art patterned magnetic card. Also, the dye used for printing the pattern was diffused in voids in the magnetic recording layer and colored layer so as to color them. Accordingly, the distance between the magnetic stripe surface and the magnetic recording layer was substantially equal in the patterned area and non-patterned area, whereby no output fluctuations due to the pattern occurred. Moreover, a smaller number of steps from the pattern-determination to the completion of a card contribute to a significantly short delivery time and quick response to pattern-modifications.

The prior art method of eliminating the difference in spacing between the magnetic stripe surface and the magnetic recording layer by printing ink having the same hue as the colored layer (concealing layer) in the non-patterned area with the negative pattern of the patterned area logically aligns the positions and levels of the print in the patterned area and the filler print in the non-patterned area. However, in practice, as being influenced by the extension of the temporal carrier base used or the like, the alignment of prints is inevitably disturbed in the longitudinal and transverse directions of the printing. Therefore, it is impossible to eliminate output fluctuations. Furthermore, in this method, a step of forming a negative pattern is added and a larger number of steps are required from the pattern-formation to the completion of a card, whereby quick response to delivery time and pattern-modifications is not available.

Examples using fluorescent dyes as the pattern-forming agent are described hereafter.

Example 7

A polyethylene terephthalate film having a thickness of 24 μm was used as the temporal carrier base. The above described paints for a fluorescent agent anti-diffusion layer, colored layer, magnetic recording layer, and heat-sensitive adhesive layer were applied and dried on one surface of the film in this order using a reverse coater to form a fluorescent agent anti-diffusion layer, colored layer, magnetic recording layer, and heat-sensitive adhesive layer, respectively.

The fluorescent agent anti-diffusion layer had a dry thickness of 1 μm; the colored layer, 4 μm; the magnetic recording layer, 9 μm; and heat-sensitive adhesive layer, 1.5 μm.

A fluorescent pattern was printed on the heat-sensitive adhesive layer of the above prepared transferable material by way of the gravure printing using the fluorescent pattern-forming ink [A] to a thickness of 1 μm as shown in FIG. 6. It was allowed to stand in a constant temperature room at 60° C. for 24 hours. At this point, the temporal carrier base was released. The transferable material was irradiated with ultraviolet light using an ultraviolet irradiator from the fluorescent agent anti-diffusion layer surface side and the fluorescent pattern was recognized. It was confirmed that the fluorescent agent was sufficiently diffused toward the transfer base side in the above aging step.

After the magnetic stripe-forming transferable laminate prepared above was cut to a specific width, the transferable material was transferred to a polyvinyl chloride card base overlay sheet (produced by Taihei Chemical Limited) using a heat seal tester (produced by Tester Sangyo). Then, the temporal carrier base film was removed. The overlay sheet was heat-pressed together with the card base center core and another overlay sheet on the opposite side using a platen pressing machine (a laboratory vulcanizing pressing machine (produced by Toyo Seiki Seisaku-sho, Ltd) at a temperature of 130 to 140° C. and a pressure of 20 kg/cm$^2$ for 20 to 30 minutes. Then, it was cut out to a card to produce a magnetic card shown in FIG. 8.

Example 8

A magnetic card was produced in the same manner as Example 7 except that the fluorescent pattern-forming ink [A]

in the fluorescent pattern printing of Example 7 was replaced with the fluorescent pattern-forming ink [B].

Example 9

A magnetic card was produced in the same manner as Example 7 except that the standing of the magnetic stripe forming transferable laminate in a constant temperature room at 60° C. for 24 hours after the fluorescent pattern-printing in Example 7 was eliminated.

Example 10

A magnetic card was produced in the same manner as Example 8 except that the standing of the magnetic stripe forming transferable laminate in a constant temperature room at 60° C. for 24 hours after the fluorescent pattern-printing in Example 8 was eliminated.

Example 11

A magnetic stripe-forming transferable laminate was prepared in the same manner as Example 7 and the fluorescent pattern was printed on the area of the card base overlay sheet (i.e. an area where the magnetic stripe was to be transferred) by way of the gravure printing using the fluorescent pattern-forming ink [A] as shown in FIG. 7. Then, a magnetic card was produced in the same manner as the magnetic card production process of Example 7.

Example 12

A magnetic card was produced in the same manner as Example 11 except that the fluorescent pattern-forming ink [A] in the pattern-printing of Example 11 was replaced with the fluorescent pattern-forming ink [B].

Comparative Example 4

A transparent overlay sheet on which a magnetic recording layer was previously formed, a center core, a transparent overlay sheet, and a magnetic tape were laminated in this order and heat-sealed by heating once to form a pre-laminated card base.

A polyethylene terephthalate film having a thickness of 188 μm was used as the temporal transfer support film. The above described paints for a fluorescent agent anti-diffusion layer, colored layer, and heat-sensitive adhesive layer were applied and dried on one surface of the film in this order using a reverse coater to form a fluorescent agent anti-diffusion layer, colored layer, and heat-sensitive adhesive layer, respectively. The fluorescent agent anti-diffusion layer had a dry thickness of 1 μm; the colored layer, 4 μm; and the heat-sensitive adhesive layer, 1 μm or smaller. After the heat-sensitive adhesive layer was formed, a fluorescent pattern was formed by the gravure printing using the fluorescent pattern-forming ink [A] to a dry thickness of 1 μm or smaller. In this way, a fluorescent patterned concealing layer transferable sheet was formed.

The fluorescent patterned concealing layer transferable sheet was placed on the magnet recording layer-containing card base with the fluorescent pattern side facing it and heat-pressed at a temperature of 120 to 130° C. and a pressure of 16 to 18 kg/cm² for 15 to 25 minutes using a platen pressing machine (a laboratory vulcanizing pressing machine (produced by Toyo Seiki Seisaku-sho, Ltd) to attach the concealing layer transferable sheet for a concealed card to the magnetic stripe-containing card base. Then, the PET film of the transfer sheet was released to form a magnetic card.

Comparative Example 5

A magnetic card was produced in the same manner as Comparative Example 4 except that the fluorescent pattern-forming ink [A] in Comparative Example 4 was replaced with the fluorescent pattern-forming ink [B].

Comparative Example 6

A magnetic card was produced in the same manner as Comparative Example 4 except that the colored layer had a thickness of 7 μm.

The magnetic cards having the fluorescent patterns were evaluated as follows.
(Pattern Stability)

After stored in a constant temperature room at 60° C. for 1000 hours, changes in the color and contour of the patterns on the magnetic cards were observed. The patterns on the magnetic cards produced in Examples 7 through 12 had no changes and maintained the color and contour.
(Concealability of the Fluorescent Patterns I)

Fluorescence emission of the fluorescent patterns was visually evaluated in the sunlight or under the room light.

○ . . . no visible fluorescence emission;

Δ . . . some visible fluorescence emission, but the pattern is unrecognizable; or x . . . visible fluorescence emission and the pattern is recognizable.
(Concealability of the Fluorescent Patterns II)

Whether the contour of the fluorescent pattern prints was visible by using reflected light from the magnetic stripe was visually determined in the sunlight or under the room light.

○ . . . no visible fluorescent pattern contour;

Δ . . . some visible fluorescent pattern contour, but the pattern is unrecognizable;

x . . . visible fluorescent pattern contour.
(Fluorescence Emission Under Ultraviolet Light)

The intensity of fluorescence emitted from the fluorescent patterns under ultraviolet light was visually evaluated.

○ . . . sufficient fluorescence emission;

Δ . . . insufficient fluorescence emission and the fluorescent pattern is difficult to be recognized; or x . . . very low fluorescence emission and the pattern is not recognized for sure.
(Output Fluctuation)

The recording/reading properties of the obtained magnetic cards were measured using "MAGTESTER 2000" produced by Barnes International Ltd based on ISO/ICE 7811-6 and the output fluctuations were obtained using the equation below. As for the magnetic stripe on the magnetic cards used for producing the sample magnetic cards, the thickness of the magnetic recording layers was adjusted according to their spacing so that the average output is equal to the standard card output.

$$\text{Output fluctuation (\%)} = ((\text{maximum output value} - \text{minimum output value})/\text{average output value}) \times 100$$

○ . . . less than 5%; Δ . . . not less than 5% and less than 10%; x . . . not less than 10%.

TABLE 2

| | Concealability of fluorescent pattern II | Concealability of fluorescent pattern I | Intensity of fluorescence emitted from fluorescent pattern | Output fluctuations |
|---|---|---|---|---|
| Example 7 | ○ | ○ | ○ | ○ |
| Example 8 | ○ | ○ | ○ | ○ |
| Example 9 | ○ | ○ | ○ | ○ |
| Example 10 | ○ | ○ | ○ | ○ |
| Example 11 | ○ | ○ | ○ | ○ |
| Example 12 | ○ | ○ | ○ | ○ |

TABLE 2-continued

|  | Concealability of fluorescent pattern II | Concealability of fluorescent pattern I | Intensity of fluorescence emitted from fluorescent pattern | Output fluctuations |
|---|---|---|---|---|
| Comparative Example 4 | Δ | x | ○ | Δ |
| Comparative Example 5 | Δ | x | ○ | Δ |
| Comparative Example 6 | ○ | Δ to x | Δ | ○ to Δ |

As apparent from the results in Table 2, Examples 7 through 12 ensured the same intensity of fluorescence emitted from the patterns as in Comparative Examples 4 and 5 that were the prior art fluorescent patterned magnetic cards. Furthermore, the fluorescent patterns were not recognized by fluorescence emission under ultraviolet light in the sunlight or room light. In Examples 7 through 12, the fluorescent agent used in the fluorescent pattern print was diffused through the magnetic recording layer and colored layer. Therefore, the fluorescent pattern print did not cause any deformation in the colored layer that may make the contour of the fluorescent pattern print part recognizable because of the reflection of visible light in the sunlight or room light. The distance between the magnetic stripe surface and the magnetic recording layer was substantially the same in the fluorescent patterned area and in the non-fluorescent patterned area, whereby no output fluctuations due to the presence of a fluorescent pattern occurred. Hence, no output fluctuations can be a criterion to verify the authenticity of a card for more reliable anti-counterfeit measure. On the other hand, in Comparative Examples 4 and 5, the colored layer provided insufficient concealing and the fluorescence emitted from the pattern under ultraviolet light in the sunlight or room light was visually recognized. Also, the level-difference of the pattern was recognizable because of the reflection of visible light, and therefore, the presence of a fluorescent pattern cannot be concealed. Even if the colored layer has an increased thickness, the condition is not improved as shown in Comparative Example 6, and instead, the intensity of fluorescence emitted was reduced.

Here again, a smaller number of steps from the pattern-determination to the completion of a card contribute to quick response to delivery time and pattern-modifications as in Examples 1 through 6 in which the patterns were formed using a coloring agent.

INDUSTRIAL APPLICABILITY

The present invention provides a magnetic recording medium having on the magnetic stripe part a pattern recognizable on the magnetic recording-reading side, a method of producing the magnetic recording medium, and a transferable laminate used in the method of producing the magnetic recording medium and is useful in card-type magnetic recording media made of a laminate including a magnetic recording layer on a card base material such as credit cards and bank cards.

The invention claimed is:

1. A magnetic recording medium having a pattern formed using a pattern-forming agent in a laminate of multiple layers including a base material and a magnetic recoding layer, wherein
   the pattern is recognized on the surface of the laminate opposite to the base material, and
   the pattern-forming agent is distributed through the thickness of the laminate, wherein a region between the center of the magnetic recording layer and a magnetic recording-reading side of the laminate has an area having a density gradient of the pattern-forming agent which gradually declines in the direction from the center of the magnetic recording layer to the magnetic recording-reading side.

2. The magnetic recording medium according to claim 1, wherein the pattern-forming agent contains a coloring agent, and there is no level-difference in a patterned area of the pattern.

3. The magnetic recording medium according to claim 1, wherein the pattern-forming agent contains a fluorescent agent, and the pattern is visually unrecognizable in sunlight or under room light on the magnetic recording-reading side.

4. The magnetic recording medium according to claim 1, wherein the density gradient of the pattern-forming agent gradually declines from the boundary of the magnetic recording layer closer to the base material to the magnetic recording-reading side.

5. The magnetic recording medium according to claim 1, having a colored layer on the magnetic recording-reading side of the magnetic recording layer.

6. The magnetic recording medium according to claim 1, having a pattern-forming agent anti-diffusion layer as the top layer on the magnetic recording-reading side of the magnetic recording layer.

7. The magnetic recording medium according to claim 1, wherein the pattern is visually recognizable on the surface of the laminate opposite to the base material of the laminate with or without ultraviolet irradiation.

8. A method of producing a magnetic recording medium having a pattern formed using a pattern-forming agent in a laminate of multiple layers including a base material and a magnetic recoding layer, wherein the pattern is recognized on the surface of the laminate opposite to the base material, and the pattern-forming agent is distributed through the thickness of the laminate, wherein a region between the center of the magnetic recording layer and a magnetic recording-reading side of the laminate has an area having a density gradient of the pattern-forming agent which gradually declines in the direction from the center of the magnetic recording layer to the magnetic recording-reading side, the method comprising:
   forming on a temporal carrier base a transferable material having at least one magnetic recording layer and a pattern formed on a surface of the magnetic recording layer opposite to the surface of the magnetic recording layer in contact with the temporal carrier base using the pattern-forming agent;
   subsequently transferring the transferable material from the temporal carrier base to the base material to form the laminate; and
   subsequently diffusing the pattern-forming agent such that the region between the center of the magnetic recording layer and a magnetic recording-reading side of the laminate has an area having a density gradient of the pattern-forming agent which gradually declines in the direction from the center of the magnetic recording layer to the magnetic recording-reading side.

9. A method of producing a magnetic recording medium having a pattern formed using a pattern-forming agent in a laminate of multiple layers including a base material and a magnetic recoding layer, wherein the pattern is recognized on the surface of the laminate opposite to the base material, and the pattern-forming agent is distributed through the thickness of the laminate wherein a region between the center of the magnetic recording layer and a magnetic recording-reading side of the laminate has an area having a density gradient of the pattern-forming agent which gradually declines in the direction from the center of the magnetic recording layer to the magnetic recording-reading side, the method comprising:
  forming on a temporal carrier base a transferable material having at least one magnetic recording layer and a pattern formed using a pattern-forming agent on a surface of the magnetic recording layer opposite to the surface of the magnetic recording layer in contact with the temporal carrier base;
  subsequently diffusing the pattern-forming agent such that the region between the center of the magnetic recording layer and the boundary of the magnetic recording layer contacting the temporal carrier base has an area having a density gradient of the pattern-forming agent which gradually declines in the direction from the center of the magnetic recording layer to the boundary of the magnetic recording layer; and
  subsequently transferring the transferable material from the temporal carrier base to the base material to form the laminate.

10. A method of producing a magnetic recording medium having a pattern formed using a pattern-forming agent in a laminate of multiple layers including a base material and a magnetic recording layer, wherein the pattern is recognized on the surface of the laminate opposite to the base material, and the pattern-forming agent is distributed through the thickness of the laminate such that a region between the center of the magnetic recording layer and a magnetic recording-reading side of the laminate has an area having a density gradient of the pattern-forming agent which gradually declines in the direction from the center of the magnetic recording layer to the magnetic recording-reading side, the method comprising:
  forming on a temporal carrier base a transferable material having at least one magnetic recording layer;
  subsequently transferring the transfer material to a pattern formed on a base layer using a pattern-forming agent to form the laminate; and
  subsequently diffusing the pattern-forming agent such that the region between the center of the magnetic recording layer and a magnetic recording-reading side of the laminate has an area having a density gradient of the pattern-forming agent which gradually declines in the direction from the center of the magnetic recording layer to the magnetic recording-reading side.

11. The method of producing a magnetic recording medium according to claim 8, 9, or 10 wherein the transferable material has multiple magnetic recording layers.

12. The method of producing a magnetic recording medium according to claim 11 wherein the pattern is formed between the multiple magnetic recording layers.

13. The method of producing a magnetic recording medium according to claim 8, 9, or 10 wherein the transferable material further has one layer or multiple layers that are not magnetic recording layers on the side of the magnetic recording layer opposite to the temporal carrier base.

14. The method of producing a magnetic recording medium according to claim 13 wherein the pattern is formed between the magnetic recording layer and the layers that are not magnetic recording layers or between the multiple layers that are not magnetic recording layers.

15. A transferable laminate having on a temporal carrier base a transferable material including at least one magnetic recording layer, wherein a pattern is formed using a pattern-forming agent between layers of the transferable material or on a surface of the transferable material opposite to the surface of the transferable material in contact with the temporal carrier base, and a region between the center of the magnetic recording layer of the transferable material and the boundary of the magnetic recording layer closer to the temporal carrier base has an area having a density gradient of the pattern-forming agent which gradually declines in the direction from the center of the magnetic recording layer to the boundary of the magnetic recording layer closer to the temporal carrier base.

16. The transferable laminate according to claim 15 having a colored layer on the temporal carrier base side of the magnetic recording layer.

17. The transferable laminate according to claim 16 having a pattern-forming agent anti-diffusion layer adjacent to the temporal carrier base.

* * * * *